US012405247B2

(12) United States Patent
Miao et al.

(10) Patent No.: US 12,405,247 B2
(45) Date of Patent: Sep. 2, 2025

(54) METHODS AND SYSTEMS FOR PROTECTING COHERENCE IN QUBITS

(71) Applicant: The University of Chicago, Chicago, IL (US)

(72) Inventors: Kevin C. Miao, Chicago, IL (US); David D. Awschalom, Chicago, IL (US)

(73) Assignee: The University of Chicago, Chicago, IL (US)

(*) Notice: Subject to any disclaimer, the term of this patent is extended or adjusted under 35 U.S.C. 154(b) by 375 days.

(21) Appl. No.: 17/998,316

(22) PCT Filed: May 10, 2021

(86) PCT No.: PCT/US2021/031569
§ 371 (c)(1),
(2) Date: Nov. 9, 2022

(87) PCT Pub. No.: WO2022/015399
PCT Pub. Date: Jan. 20, 2022

(65) Prior Publication Data
US 2023/0314374 A1    Oct. 5, 2023

Related U.S. Application Data

(60) Provisional application No. 63/023,579, filed on May 12, 2020.

(51) Int. Cl.
*G01N 27/82*    (2006.01)
*G06N 10/40*    (2022.01)

(52) U.S. Cl.
CPC ............ *G01N 27/82* (2013.01); *G06N 10/40* (2022.01)

(58) Field of Classification Search
CPC .................................................... G06N 10/40
See application file for complete search history.

(56) References Cited

U.S. PATENT DOCUMENTS 6,800,837 B1 * 10/2004 Ichimura .................. G02F 3/00
250/214 R
2015/0242758 A1    8/2015 Bonderson et al.
2016/0275410 A1    9/2016 Rogge et al.

OTHER PUBLICATIONS

Gatis Mikelsons et al 2015 New J. Phys. 17 053032 (Year: 2015).*
Abobeih, M. H. et al.; "One-second coherence for a single electron spin coupled to a multi-qubit nuclear-spin environment", Nat. Commun., 2018, 1-8, 9 (8 pages).
Anderson, C. P. et al.; "Electrical and optical control of single spins integrated in scalable semiconductor devices", Science, 2019, 1225-1230 (6 pages).
Balasubramanian, G. et al.; "Ultralong spin coherence time in isotopically engineered diamond", Nat. Mater., 2009, 383-387, 8 (6 pages).

(Continued)

*Primary Examiner* — Matthew L Reames
(74) *Attorney, Agent, or Firm* — Crowell & Moring LLP

(57) ABSTRACT

The disclosure is directed to devices, systems, and methods for a generation of a decoherence-protected subspace in a quantum system. The decoherence-protected subspace provides the quantum system with reduced sensitivity to environmental magnetic, electric, and thermal noises. Quantum information operation based on the quantum system can be performed while this decoherence-protected subspace is maintained.

20 Claims, 19 Drawing Sheets

(56) References Cited

OTHER PUBLICATIONS

Barfuss, A. et al.; "Strong mechanical driving of a single electron spin", Nat. Phys., 2015, 820-824, 11 (6 pages).
Bar-Gill, N. et al.; "Solid-state electronic spin coherence time approaching one second", Nat. Commun., 2013, 4 (6 pages).
Bauch, E. et al.; "Ultralong Dephasing Times in Solid-State Spin Ensembles via Quantum Control", Phys. Rev. X, 2018, 31025, 8 (11 pages).
Cai, J. M. et al.; "Robust dynamical decoupling with concatenated continuous driving", New J. Phys., 2012, 14 (17 pages).
Chen, H. Y. et al.; "Orbital State Manipulation of a Diamond Nitrogen-Vacancy Center Using a Mechanical Resonator", Phys. Rev. Lett., 2018, 167401, 120 (6 pages).
Christle, D. J. et al.; "Isolated electron spins in silicon carbide with millisecond coherence times", Nat. Mater., 2015, 160-163, 14 (4 pages).
Christle, D. J. et al.; "Isolated Spin Qubits in SiC with a High-Fidelity Infrared Spin-to-Photon Interface", Phys. Rev. X, 2017, 1-12, 7 (12 pages).
Devoret, M. H. et al.; Superconducting Qubits: A Short Review, 2004 (42 pages).
Falk, A. L. et al.; "Electrically and Mechanically Tunable Electron Spins in Silicon Carbide Color Centers", Phys. Rev. Lett., 2014, 1-6, 112 (6 pages).
Falk, A. L. et al.; "Polytype control of spin qubits in silicon carbide", Nat. Commun., 2013, 1-7, 4 (7 pages).
Fuchs, G. D. et al.; "A quantum memory intrinsic to single nitrogen-vacancy centres in diamond", Nat. Phys., 2011, 789-793, 7 (5 pages).
Grezes, C. et al.; "Multimode Storage and Retrieval of Microwave Fields in a Spin Ensemble", Phys. Rev. X, 2014, 1-9, 4 (9 pages).
Herbschleb, E. D. et al.; "Ultra-long coherence times amongst room-temperature solid-state spins", Nat. Commun., 2019, 8-13, 10 (6 pages).
Khazen, K. et al.; "High-resolution resonant excitation of NV centers in 6H-SiC: A matrix for quantum technology applications", Phys. Rev. B, 2019, 1-9, 100 (9 pages).
Klimov, P. V. et al.; "Electrically Driven Spin Resonance in Silicon Carbide Color Centers", Phys. Rev. Lett., 2014, 1-5, 112 (5 pages).
Klimov, P. V. et al.; "Quantum entanglement at ambient conditions in a macroscopic solid-state spin ensemble", Sci. Adv., 2015, 1-8, (7 pages).
Kubo, Y. et al.; "Strong Coupling of a Spin Ensemble to a Superconducting Resonator", Phys. Rev. Lett., 2010, 1-4, 105 (4 pages).
Kurizki, G. et al.; "Quantum technologies with hybrid systems", Proc. Natl. Acad. Sci. U. S. A., 2015, 3866-3873, 112 (8 pages).
Laucht, A. et al.; "A dressed spin qubit in silicon", Nat. Nanotechnol., 2017, 61-66, 12 (6 pages).
MacQuarrie, E. R. et al.; "Continuous dynamical decoupling of a single diamond nitrogen-vacancy center spin with a mechanical resonator", Phys. Rev. B, 2015, 1-13, 92 (13 pages).
Maurer, P. C. et al.; "Room-Temperature Quantum Bit Memory Exceeding One Second", Science, 2013, 1283-1287 (4 pages).
Miao, K. C. et al.; "Electrically driven optical interferometry with spins in silicon carbide", Sci. Adv., 2019, 5 (7 pages).
Morse, K. J. et al.; "Zero-field optical magnetic resonance study of phosphorus donors in 28-silicon", Phys. Rev. B, 2018, 1-5, 97 (5 pages).
Mu, Z. et al.; Coherent manipulation of nitrogen vacancy centers in 4H silicon carbide with resonant excitation, 2020, 1 (11 pages).
Nielsen, M. A. et al.; "Quantum Computation and Quantum Information", Cambridge University Press, 2011, doi:10.1080/00107514. 2011.587535 (3 pages).
Reiserer, A. et al.; "Robust Quantum-Network Memory Using Decoherence-Protected Subspaces of Nuclear Spins", Phys. Rev. X, 2016, 1-8, 6 (8 pages).
Robledo, L. et al.; "High-fidelity projective read-out of a solid-state spin quantum register", Nature, 2011, 574-578, 477 (5 pages).
Schlosshauer, M.; "Quantum decoherence", Physics Reports, 2019, doi:10.1016/j.physrep.2019.10.001 (57 pages).
Schwartz, I. et al.; "Robust optical polarization of nuclear spin baths using Hamiltonian engineering of nitrogen-vacancy center quantum dynamics", Sci. Adv., 2018, 1-8, 4 (7 pages).
Seo, H. et al.; "Quantum decoherence dynamics of divacancy spins in silicon carbide", Nat. Commun., 2016, 1-9, 7 (9 pages).
Stanwix, P. L. et al.; "Coherence of nitrogen-vacancy electronic spin ensembles in diamond", Phys. Rev. B—Condens. Matter Mater. Phys., 2010, 7-10, 82 (4 pages).
Teissier, J. et al.; "Hybrid continuous dynamical decoupling: A photon-phonon doubly dressed spin", J. Opt. (United Kingdom), 2017, 19 (7 pages).
Whiteley, S. J. et al.; "Spin-phonon interactions in silicon carbide addressed by Gaussian acoustics", Nat. Phys., 2019, 490-495, 15 (7 pages).
Wolfowicz, G. et al.; "Atomic clock transitions in silicon-based spin qubits", Nat. Nanotechnol., 2013, 561-564, 8 (5 pages).
Xu, X. et al.; "Coherence-Protected Quantum Gate by Continuous Dynamical Decoupling in Diamond", Phys. Rev. Lett., 2012, 1-5, 109 (5 pages).
Cai, J-M et al.; "Robust dynamical decoupling with concatenated continuous driving"; New Journal of Physics; DOI: 10.1088/1367-2630/14/11/113023; Nov. 20, 2012; 17 pages.
International Search Report and Written Opinion mailed Feb. 1, 2022 for International Application No. PCT/US2021/031569.

\* cited by examiner

METHODS AND SYSTEMS FOR PROTECTING COHERENCE IN QUBITS

CROSS REFERENCE

This application is a national phase entry of the PCT International Patent Application No. PCT/US21/31569, filed on May 10, 2021, which is based on and claims priority to U.S. Provisional Application No. 63/023,579, filed on May 12, 2020, the entireties of which are herein incorporated by reference.

GOVERNMENT LICENSE RIGHTS

This invention was made with government support under D18AC00015 awarded by Department of Defense, FA9550-19-1-0358 awarded by United States Air Force, N00014-17-1-3026 awarded by United States Navy, DMR-1420709 awarded by National Science Foundation. The government has certain rights in the invention.

BACKGROUND

1. Technical Field

The present disclosure generally relates to methods, devices, and systems for suppressing decoherence of quantum states due to environmental electric, magnetic, temperature, and strain fluctuations, and for quantum information processing, control, and readout while the quantum states are protected.

2. Background Information

Various quantum information processing functions require long coherence times and protection of quantum information carried in qubits from being irreversibly destroyed by environmental noises. Some quantum systems are already inherently insensitive to certain types of environmental interactions that cause decoherence of spins. Further protection of such quantum systems from decoherence due to these types of interactions and other additional interactions is desirable for providing a more robust quantum information processing platform.

SUMMARY

This application discloses methods, device, and systems for devices, systems, and methods for a generation of a decoherence-protected subspace in a quantum system. The decoherence-protected subspace provides the quantum system with reduced sensitivity to environmental magnetic, electric, and thermal noises. Quantum information operation based on the quantum system can be performed while this decoherence-protected subspace is maintained.

In some implementations, a method is disclosed. The method includes providing a quantum system having a first quantum state, a second quantum state, and a third quantum state corresponding to a first energy level, a second energy level, and a third energy level forming a first quantum subspace; applying a dressing drive field, resonant with an energy splitting between the second and third energy levels, to induce a hybridization of the dressing drive field and the second and third energy levels to generate a fourth hybridized state and a fifth hybridized state wherein the first quantum state, the fourth hybridized state and the fifth hybridized state form a second quantum subspace with enhanced coherence protection of a quantum state of the quantum system from environmental noises over the first quantum subspace; performing a coherent control of a quantum superposition in the second quantum subspace while maintaining the dressing drive field; mapping the quantum superposition in the second quantum subspace to the first quantum subspace; and reading out the quantum superposition in the first quantum subspace.

In some other implementations, a device is disclosed. The device includes a quantum system and at least two electrodes adapted to apply external electric or magnetic fields to the quantum system. The quantum system includes a first quantum state, a second quantum state, and a third quantum state corresponding to a first energy level, a second energy level, and a third energy level forming a first quantum subspace. The at least two electrodes are adapted to apply a dress drive field resonant with an energy splitting between the second and third energy levels to induce a hybridization of the dressing drive field and the second and third energy levels to generate a fourth hybridized state and a fifth hybridized state wherein the first quantum state, the fourth hybridized state and the fifth hybridized state form a second quantum subspace with enhanced coherence protection of a quantum state of the quantum system from environmental noises over the first quantum subspace; and the at least two electrodes are adapted to effectuate a coherent control of a quantum superposition in the second quantum subspace while maintaining the dressing drive field.

DETAILED DESCRIPTION OF THE DISCLOSURE

Figure 1:
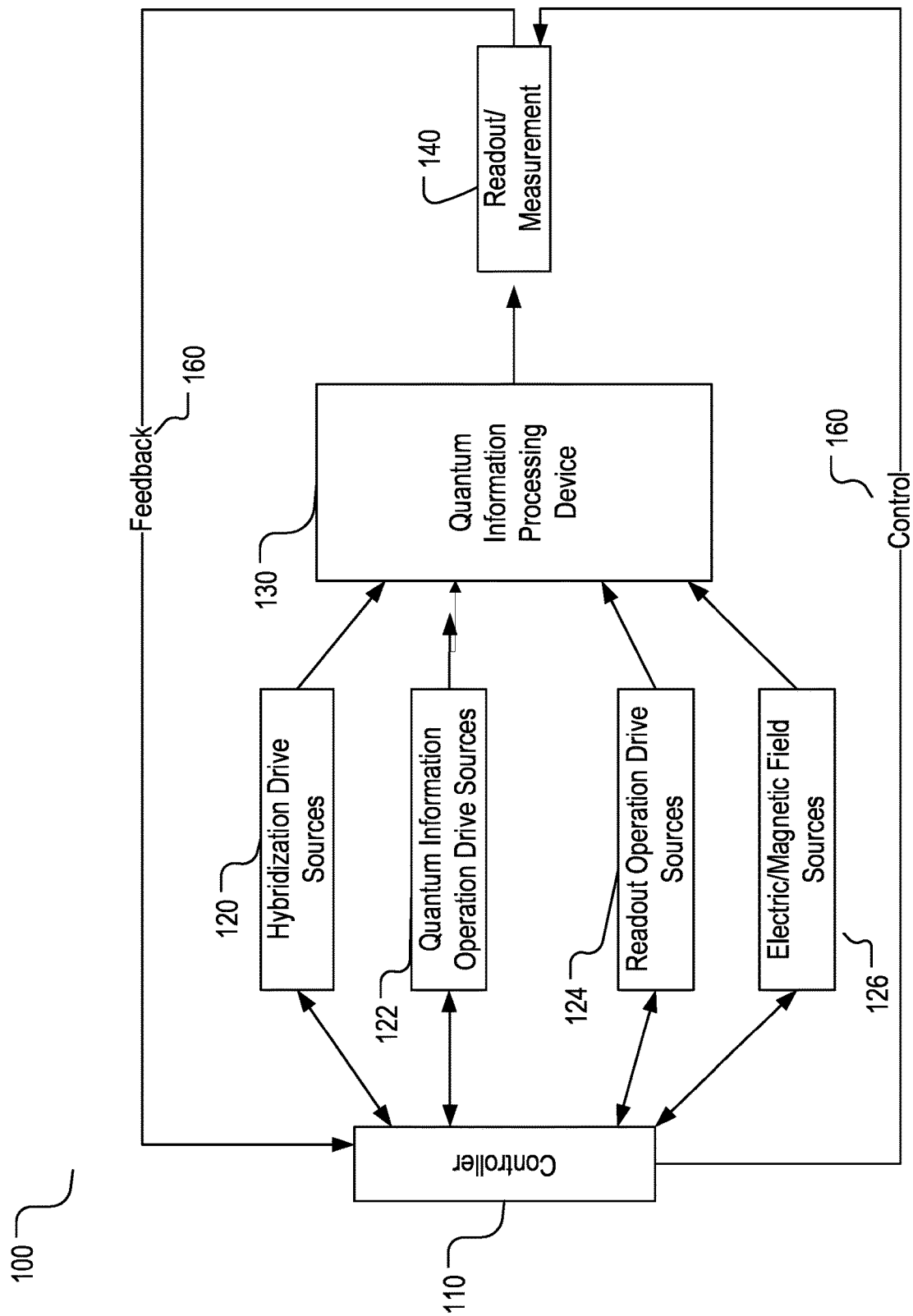
FIG. 1 shows an example system for achieving quantum information operations in a decoherence-protected subspace in a quantum information processing device.

The present disclosure relates to methods, devices, and systems for suppressing decoherence of quantum spin states due to environmental electric, magnetic, temperature, and strain fluctuations, and for quantum information processing, control, and readout while such quantum states are protected.

The disclosed systems and methods are described above with reference to the accompanied drawings that form a part of the present application and show. The described systems and methods, however, are not meant to be limiting. This disclosure may be embodied as methods, devices, components, or systems. Accordingly, embodiments of the disclosed system and methods may, for example, take the form of hardware, software, firmware or any combination thereof. Various modifications of the illustrative embodiments and additional embodiments of the disclosure will be apparent to one of ordinary skill in the art from this description. Those skilled in the art will readily recognize that these and various other modifications can be made to the example embodiments, illustrated and described herein, without departing from the spirit and scope of the present disclosure. It is, therefore, contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

INTRODUCTION

Quantum information processing relies on quantum coherence (or well-defined quantum phase relationships) in qubits. All physical realizations of qubits, however, suffer from decoherence interactions that reduce or destroy the phase information encoded within the qubits. Mitigating these unwanted interactions facilitates the realization of robust physical systems for quantum information processing.

The disclosure below are directed to methods, devices, and systems for protecting a qubit from decoherence caused by environmental noises. Such environmental electric, magnetic, temperature, and/or strain noises/fluctuations, for example, may induce electric magnetic field, and crystal lattice fluctuations in the environment of the qubit. For example, such environment fluctuations in a solid-state environment may originate from magnetic fluctuations of surrounding nuclear spin bath, charge fluctuations in surrounding impurities, and the like. In the various implementations described blow, a hybridization of a microwave drive field and a qubit having an example electronic energy structure is used to generate a decoherence-protected subspace of quantum states in the qubit in which quantum information carried by the qubit is manipulated while its coherence is protected. Once embedded in this subspace, the qubit becomes less sensitive to magnetic, electric, and temperature fluctuations while coherence control mechanism bypass this insensitivity and the qubit still has full response to desired control interactions. As such, the quantum coherence is substantially protected while the quantum information operations are being carried out. Further, readout of a resulting quantum superposition state can be conveniently performed on states in a different subspace that are not driven by the hybridizing microwave field via a deterministic quantum state mapping process.

Compared to an undriven basis, both the inhomogeneous dephasing time and Hahn-echo coherence time of an example electron spin system is improved by orders of magnitude. These implementations providing substantial coherence improvements can be applied in a wide selection of quantum information processing architectures, and facilitate a creation of robust hybrid quantum systems interfacing with otherwise weakly interacting quantum subsystems.

General Quantum Systems for Providing Decoherence-Protected Subspace

Figure 4:
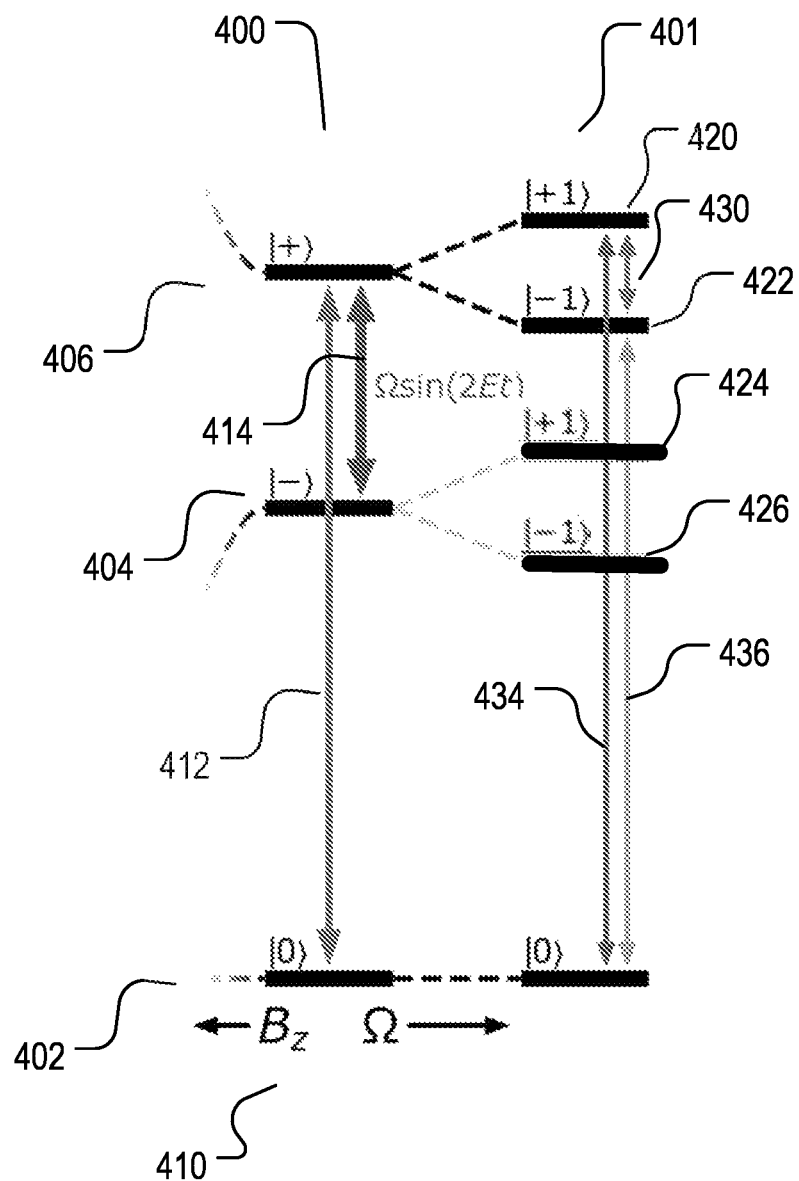
FIG. 4 illustrates example energy diagram for an electron spin of a defect in a solid state host in an undriven basis and in a decoherence-protected subspace.

Generally, a quantum system suitable as a platform for the implementations described below generally includes one or more n-level single or ensemble of quantum systems, where $n \geq 3$. Each energy level may correspond to one or more quantum states. These energy levels may be occupied by electrons, holes, or other types of quasiparticles. An avoided crossing may be formed between two of those n levels, denoted as X and Y. In other words, levels X and Y sufficiently split in energy to avoid level crossing under normal external electric or magnetic disturbances. Specifically, levels X and Y are sufficiently split by an interaction that does not commute with the interactions caused by disturbances, or the energy splitting is significantly larger than all orthogonal perturbative elements. In our case, when B=0, this condition is satisfied. Further, initialization into one of these n levels other than levels X and Y, denoted as level Z, is not affected by the avoided crossing. A transition (e.g., dipole transition or spin transition) between Z and X, and/or between Z and Y are allowed. The states Z, X, and Y may form a non-driven quantum subspace, denoted as S. FIG. 4 shows an example quantum system 400 with levels 406, 404, 402 (respectively X, Y and Z) forming the subspace S.

While the detailed description in this disclosure focuses on an example solid-state electronic spin system, the underlying principles for the generation of decoherence-protected subspace of quantum states and quantum information operations in such a subspace apply to many other systems.

To create the decoherence protected subspace, denoted as S', a continuous drive field, e.g., an electromagnetic field, can be applied in resonance between energy levels X and Y to generate a hybridization between the drive field and the quantum states corresponding to energy levels X and Y, resulting in energy levels X' and Y' in the driven basis. For example, an electro-magnetic field resonant with two electronic states may induce an Autler-Townes effect, generating two dressed states in the driven basis. The level or state Z and the hybridized levels or states X' or Y' may form a driven basis alternatively referred to as a decoherence-protected subspace, S'. These states in the decoherence-protected subspace S' can be coherently controlled while the hybridization drive is continuously applied. In the example system 400, the subspace S' is formed by the levels 420, 422 (respectively X' and Y') with the drive field being shown as 414. For quantum manipulation in the decoherence-protected subspace S', an allowed transition (434 in FIG. 4) between Z and X' and/or an allowed transition (436 in FIG. 4) between Z and Y' can be utilized. Further, an allowed transition between X' and Y' (430 in FIG. 4) may be utilized to facilitate direct population transfer.

The allowed transitions above in the decoherence-protected subspace S' may be induced by AC electric fields, AC magnetic fields, electromagnetic waves, strain field, or mechanical driving. The amplitude and/or timing of these driving fields may be adjusted to achieve coherent control of a superposition state in the decoherence-protected subspace S'. Because of the protection by the continuous hybridization drive field, the quantum coherence in the subspace S' involving Z, X', and Y' is maintained to a higher degree as compared to the undriven subspace S formed by states Z, X, and Y.

In general, the levels X and Y are close to each other, and the level Z is farther away, either above or below both of the level X and Y. In the illustrated example of FIG. 4, the level Z is below levels X, Y. In the illustrated example of FIG. 4, initialization occurs in level Z, but could generally be in any of the levels X, Y, Z.

For quantum information readout, the quantum superposition in the decoherence-protected subspace S' may be mapped to the undriven subspace S. For example, when readout is needed, the hybridization drive field may be removed and the quantum superposition in the subspace S' would map to the subspace S. In some example implementations, the removal of the hybridization drive field may be performed non-adiabatically. In other words, the hybridization drive may be removed at a faster time scale than the inverse of the energy gap between X and Y. For example, the hybridization drive field may be removed about 10 times faster than the inverse of the energy gap between X and Y.

Continuous Protection from Decoherence Due a Broad Range of Interactions

In the implementations described above and in more detail below, the decoherence-protected subspace S' is continuously maintained and the hybridization driving field does not take away the ability to perform coherent control and quantum information operation in the subspace S'. Such decoherence-protection scheme or protocol is thus advantageous in comparison with conventional decoherence correction (or reversal) offered by, for example, pulse dynamical decoupling techniques in several aspects.

For example, the continuous decoherence-protection scheme disclosed herein enables arbitrary on-demand manipulation of the quantum states with reduced decoherence. In particular, one of the aspects of this protocol that is very difficult to achieve in pulsed dynamical decoupling is the capability to arbitrarily manipulate the spin while it is protected. In this sense, pulsed dynamical decoupling may be applied to protect a static state for storage, creating a "memory". But there are many restrictions on how to manipulate and update this memory, and typical protocols assume that no quantum manipulation needs to be done during the protection. Creative procedures are required to overcome these restrictions. In the decoherence-protection protocol using a hybridization drive field described in this disclosure, quantum information manipulation can be performed directly and with few or no limitations or special procedures. The quantum coherence experiences reduced decoherence as its response to noise may be significantly attenuated in the hybridized subspace.

The decoherence-protection protocol disclosed herein further provides uninterrupted coherence protection. On the contrary, during pulsed dynamical decoupling, periodic manipulation of the quantum states is performed using pulses. These pulses require a non-zero amount of time to execute, and during these times the quantum system experiences less coherence protection than during free evolution. In the decoherence-protection protocol described herein, there are no interruptions. As such, the quantum system experiences a lower degree of protection under pulsed dynamical decoupling.

The decoherence-protection protocol disclosed herein also enables lower peak power of drive field used for achieving decoherence protection. For example, in the pulsed dynamical decoupling protocol, in order to reduce the duration where there may be an interruption in coherence protection, a typical route is to increase the pulse amplitude of the drive field (and proportionally reduce the pulse time such that the pulse time multiplied by the pulse amplitude is maintained at a constant). The consequence, however, is that the quantum system experiences periodic instances of increased heating, as at high pulse amplitudes there can be significant dissipative Joule heating (Joule heating scales as the square of the amplitude). In the decoherence-protection protocol disclosed herein, a low-amplitude continuous hybridization drive field is applied, thereby ensuring that there are reduced or no spikes in Joule heating that could induce unexpected and uncontrolled temperature fluctuations in the quantum system.

The decoherence-protection protocol disclosed herein also suffer from fewer non-idealities that occur in implementing the pulsed dynamic decoupling protocol. For example, an ideal implementation of pulsed dynamical decoupling typically requires a drive pulse to modify the quantum system by a near-exact quantity (e.g., $\pi$ or $\pi/2$ rotation in a spin system). However, in practical implementations, the modification of the quantum system may not be precisely controlled to achieve the exact quantity and as a result, pulse errors accumulate. Furthermore, drive pulses in pulsed dynamical decoupling protocol are intrinsically more difficult to create, as the rising or falling edges of the pulses may have noisy artifacts that further disrupt the quantum system. In the decoherence-protection protocol described herein, a continuous drive field is used for the hybridization and the creation of the decoherence-protected subspace S' without rising or falling edges. As shown in more detail below, potential drive errors caused by amplitude drift of the hybridization drive field can be further minimized via an active feedback mechanism.

The decoherence-protection protocol disclosed herein also additionally operates with fewer assumptions about the form of the environmental noises. In many pulsed dynamical decoupling sequences, certain parameters of free evolution time can actually enhance the interaction (and thus noise) with a particular subset of environmental fluctuation sources. Such enhancement of interactions may be utilized for executing quantum information operation with other weakly-coupled quantum systems. However, if the purpose is to operate a quantum system in a decoherence-protected regime at arbitrary times, then pulsed dynamical decoupling sequences can be difficult to use, since at select moments in the sequence for a particular configuration of weakly-coupled quantum systems, the coherence of the quantum system is significantly degraded. In the decoherence-protection protocol disclosed herein, there are no times when this occurs, as the interactions with all weakly-coupled quantum systems are suppressed if the interactions are non-resonant. Thus, algorithms that may require a wide range of times where the quantum system is coherent may benefit from this scheme to protect the quantum system from decoherence.

Example Implementation Architecture

FIG. 1 shows an example system architecture 100 for implementing the decoherence-protection subspace, quantum information operation in the decoherence-protected subspace, and quantum information readout. The system 100 includes a quantum information processing device 130, a controller 110, and hybridization drive sources 120. The system 100 may further optionally include quantum information operation drive sources 122, readout operation drive sources 124, other electric/magnetic field sources 126, and readout/measurement apparatus 140.

The quantum information processing device 130, for example, includes single or ensemble of quantum systems that are suitable as a platform for implementing the decoherence-protection subspace, quantum information operation in the decoherence-protected subspace, and quantum information readout discussed above and in the example implementations below.

The controller 110 may be of any form of dedicated circuits, general-purpose instruments, and mobile or fixed electronic devices including but not limited to desktop computer, laptop computers, tablets, mobile phones, personal digital assistants, and the like. The controller 110 may be configured to provide a user interface for commanding the various other components of the system 100 as shown in FIG. 1 to control the hybridization, quantum information operations and readout in the quantum information processing device 130. The controller 110 may include communication interfaces, a processor, input/output (I/O) interfaces, storages, and display circuitry. The controller 110 may communicate with one or more of the other components of the system 100 to send/receive commands, data, or the like.

The hybridization drive sources 120 are configured to provide one or more hybridization drive fields. For example, the hybridization drive sources 120 may include one or more microwave sources and corresponding amplifiers. The timing of the hybridization drive sources 120 may be controlled via the controller 110. For example, the hybridization drive sources 120 may be controlled to provide a continuous drive field to the quantum information processing device during a sequence of quantum information operations and to remove the hybridization drive field, e.g., non-adiabatically, prior to quantum information readout by the readout/measurement apparatus 140.

The quantum information operation drive sources 120 are configured and controlled by the controller 110 to perform quantum information operations in the quantum information processing device 130 while in the hybridized subspace S'. For example, the quantum information operations may include a sequence of quantum logic operations and the quantum information processing device 130 in the subspace S' functions as one or more quantum logic gates. The quantum information operations may be performed via external electric, magnetic, electromagnetic (including optical) and other types of coupling between the quantum states in the decoherence-protected subspace S'. Correspondingly, the quantum information operation drive sources 122 may be implemented in the forms of electric, magnetic, or electromagnetic field sources. Parameters such as amplitude, phase, and timing (e.g., pulse length) of these fields can be controlled by the controller 110 to achieve a desired sequence of quantum information operations in the device 130.

The readout operation drive sources 124 are configured and controlled by the controller 110 to perform quantum information readout from the quantum information processing device 130 either in the subspace S' while the hybridization drive field is continuously applied, or after the hybridization drive field is removed and the quantum states in the subspace S' is mapped to the subspace S. The controller 110 further controls the readout/measurement apparatus 140 for performing the readout of the quantum state. The readout operation may be performed via external electric, magnetic, electromagnetic (including optical) and other means. For example, the quantum state in the quantum information processing device 130 may be further transformed or modified by the readout operation via measurement of, e.g., optical emission, microwave emission, or magnetization. Correspondingly, the readout/measurement apparatus 140 may include optical detectors, microwave detectors, and other types of detection devices as controlled by the controller 110, as shown by arrow 160.

As further shown by 160 in FIG. 1, other measurements from the quantum information processing device 130 may be fed back to the controller 110 for adjusting the various other components of the system 100. For example, as described in more detail below, the feedback may enable adjustment of the hybridization drive sources 120 to compensate for amplitude drift of the hybridization drive field such that hybridization subspace S' is precisely maintained.

The various drive sources in FIG. 1 may be implemented as optical sources. These optical sources, for achieving coherent excitation of the quantum information processing device 130, may preferably comprise laser sources with sufficient optical coherence characteristics. These optical sources may operate in either a pulsed mode or a continuous wave (CW) mode in time. The optical sources may produce one or more optical beams to interact with the quantum information processing device 130 at different time points that may be configured by the controller 110. The one or more optical beams may propagate in free space, optical fibers, or a combination thereof. The one or more optical beams may be further processed by one or more optical components including but not limited to mirrors, lenses, prisms, optical polarizers, and objectives of confocal microscope. The one or more optical beams may be focused onto a particular region of the quantum information processing device 130 to address either a single or an ensemble of quantum systems. The one or more optical beams processed by the one or more optical components may be scanned across different regions of the quantum information processing device 130 so that the one or more optical beams may interact with different quantum systems simultaneously or in a sequential manner.

The optical sources or other sources for electric, magnetic, or electromagnetic fields may be frequency tunable. For example, the optical sources may include one or more lasers with tunable wavelength. The wavelength of such tunable lasers may be controlled by the controller 110 in conjunction with tunable optical elements having variable optical properties within the optical sources. Likewise, frequencies of other electric, magnetic, or electromagnetic fields may also be tuned as needed. These fields, in particular, may be tuned to be in resonance or off resonance between various quantum states in the subspace S or subspace S' of the quantum information processing device 130.

The electric/magnetic field sources 126 may be used to generate and apply, for example, DC electric or magnetic fields to the quantum information processing device 130. The DC electric fields may be applied for various purposes. For example, a DC electric field may be applied for device characterization. For another example, one or more DC fields may be applied to create charge depletion or reduce an amount of unwanted free environmental charges in a host of the quantum information processing device 130, thereby further reducing fluctuation of electric environment. For another example, one or more DC fields may be applied to compensate or adjust strain fields in a host for the quantum information processing device. For another example, static magnetic field may be applied to the quantum information processing device 130 for controlling the mixing of the quantum states (increasing mixing of the quantum states or reducing mixing of the quantum dates). Both the amplitude and direction of these electric or magnetic fields may be controlled by configuring location and orientation of various electrodes and coils within or external to the quantum information processing device 130.

Example Quantum System: Defects in Silicon Carbide Lattice

An example quantum system of the quantum information processing device 130 of FIG. 1 may include a solid-state host with defects. The defects embedded in the solid-state host may provide electron orbital and/or spin quantum states. For example, the electron spin states of the defects in the ground-state electron orbitals may be used for the generation of a decoherence-protected spin subspace and for quantum information processing and readout.

Figure 2:
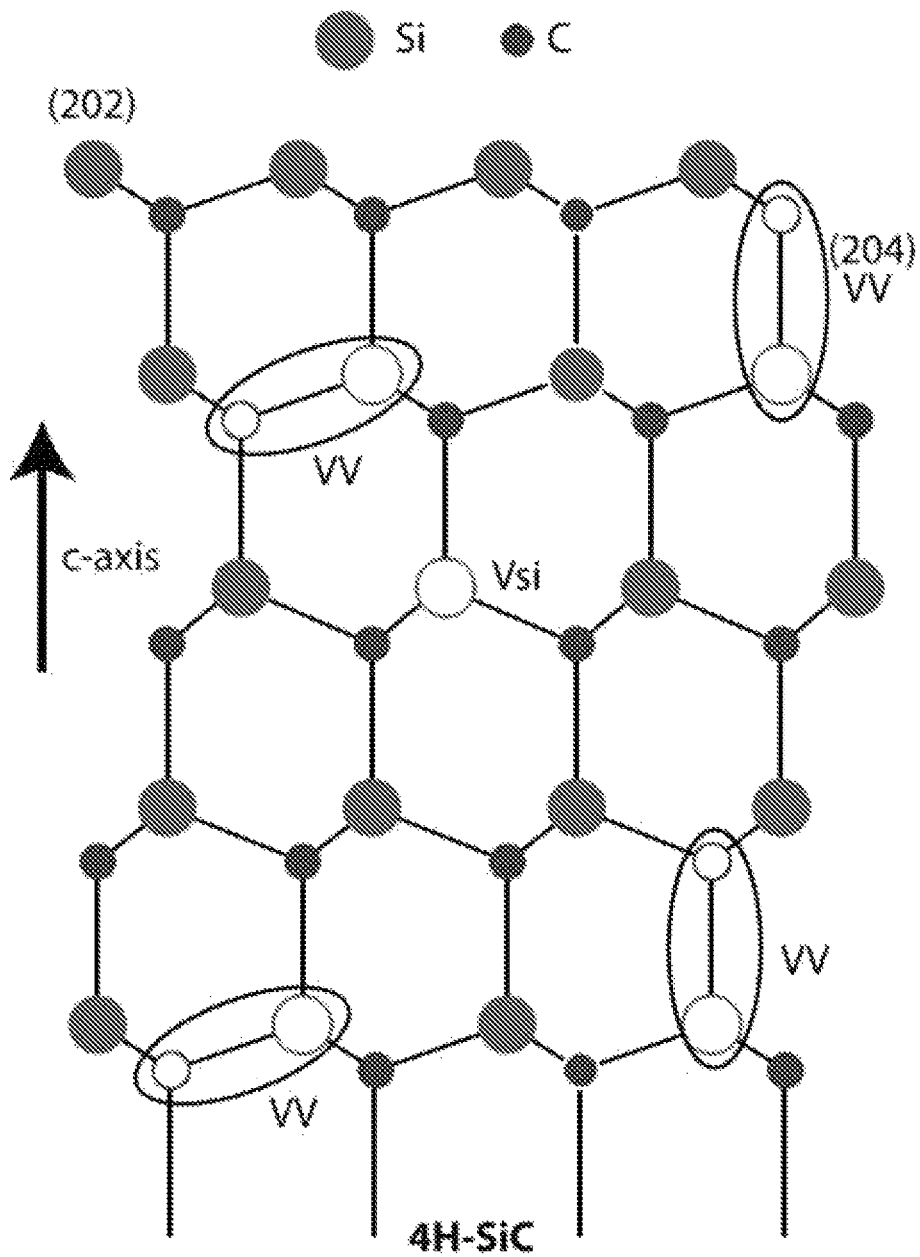
FIG. 2 shows an example electron spin system containing defects in solid-state host.

The solid state host, for example, may include but is not limited to a semiconductor crystalline lattice. Such a semiconductor crystalline lattice host may include but is not limited to a silicon carbide (SiC) lattice. A SiC lattice may be produced in various crystalline forms, including but not limited to poly type of 4H—SiC, 6HSiC, and 3C—SiC. Example defects may include but are not limited to basally-oriented kh and kh divacancy (VV) defects in, for example, 4H SiC, and $k_1k_2$ divacancy defects in 6H—SiC. FIG. 2 shows an example crystalline structure of 4H SiC (202) embedded with W detects 204. The VV defects, as shown in FIG. 2, may be oriented in different axis.

The solid-state host for the defects may be fabricated in various device geometries. For example, the solid host may include a SiC crystalline layer with a thickness from about 10 micrometers to about 10 millimeters. The SiC layer may include i-type high-purity SiC epitaxially grown. The growth may be performed along various crystal axes. For example, the growth may be performed on a 4° off-axis miscut of the Si face of a high-purity semi-insulating SiC substrate (serial number A3177-14, Norstel AB). In some implementations, electron irradiation with, for example, 2-MeV electrons at a dose of, e.g., $3\times10^{12}$ e$^-$/cm$^2$ and subsequent annealing at 850° C. for 30 min in Ar produces neutral divacancies uniformly throughout the epitaxial i-type 4H—SiC. The defects may be distributed in the solid-state host layer in any distribution profile and in any density. For example, the defects may be distributed with a density that is sufficiently low to allow for spatial addressability of single defects by the optical beams/fields. The defects may be located, for example, within a depth of 0 to 50 micrometers to its top surface. The thermal environment for the solid-state device 130 may be further controlled. For example, the solid-state device 130 may be kept at some particular temperature or within some particular temperature range. For example, the solid-state device 130 may be kept at a low temperature, e.g., <20K. Defects may be created in the solid-host of the solid-state device 130 in various manners, as described in further detail below.

The solid-state defect quantum information processing device 130 may include various electrodes. These electrodes may be used for applying the various electric, magnetic, or electromagnetic fields described above in relation to FIG. 1. These various fields may be applied using separate electrodes or shared electrodes. The electrodes may be fabricated by various means. For example, the electrodes may be lithographically patterned on the top surface of the solid-state device 130. For another example, the electrodes may be electrically accessible external of the solid-state device 130 but are otherwise embedded in the solid-state device 130. In some implementations, the electrodes may be multiple sets of electrodes, where each set of electrodes may be used for locally applying fields one or more fields to a subset of one or more detects embedded in the solid-state host. These electrodes may be configured to enable a control of the direction of the applied fields with respect to the crystal axis of the solid-state host.

Figure 3:
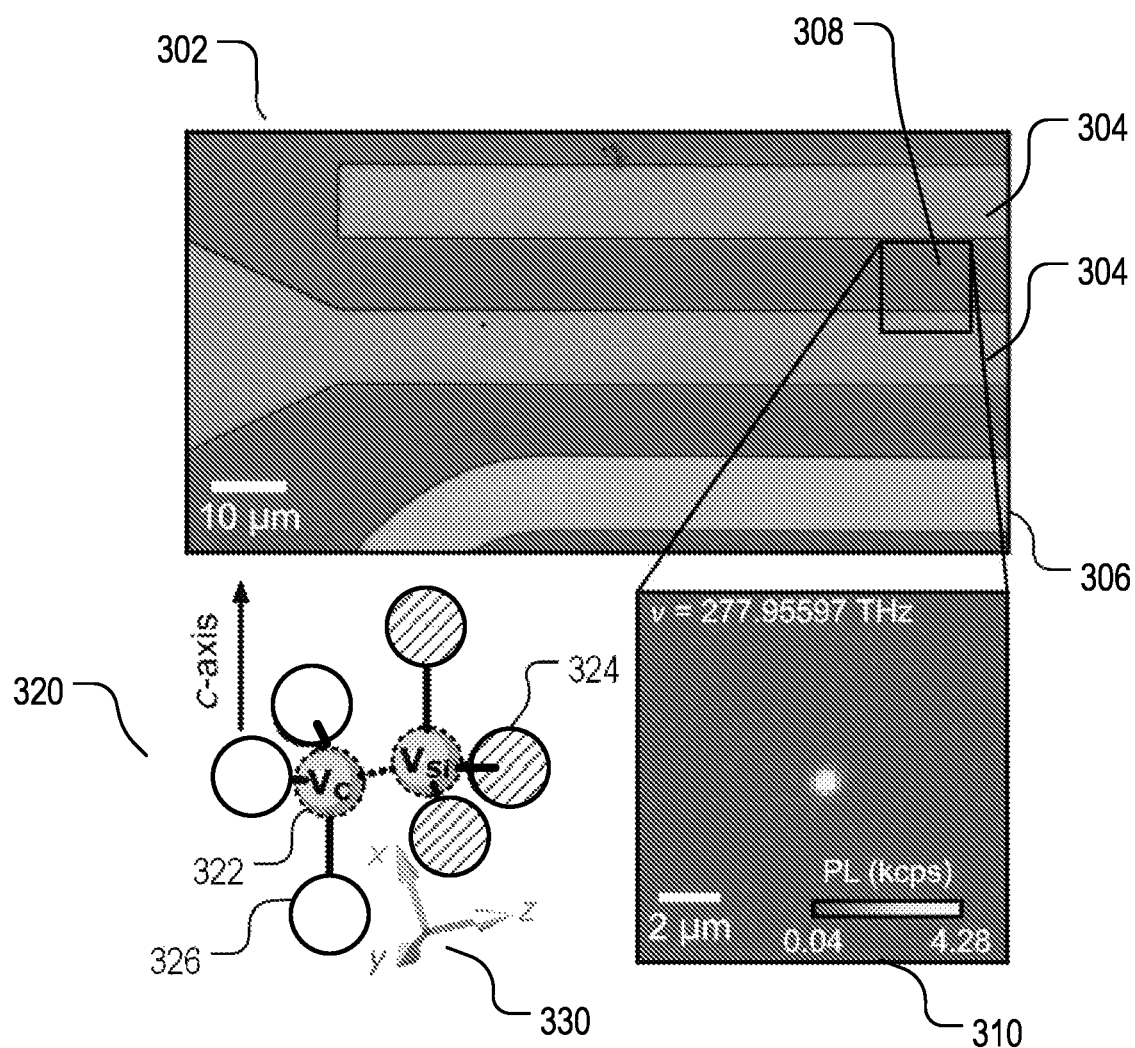
FIG. 3 shows an example device based on the electron spin system of FIG. 2.

FIG. 3 shows an example of such a solid-state defect quantum information processing device fabricated with a set of electrodes. In particular, 302 of FIG. 3 shows a false-color optical microscope image of an example 4H—SiC device showing lithographically patterned electrodes forming a capacitor (304) for applying electric fields and a wire (306) for applying microwave-frequency electromagnetic fields to the region of the device, e.g., region 308. The capacitor 304, for example, may be configured as a coplanar capacitor structure. The gap between the two polarities of the capacitor may be, for example 10 microns. The electrodes of FIG. 3 may be fabricated from various conductive materials, including but not limited metal materials such as Ti or Au. In FIG. 3, 310 further shows single kh divacancy under resonant optical excitation. Further in lattice diagram 320, a kh divacancy is shown as 322, nearest-neighbor carbon atoms are shown as 324, and nearest-neighbor silicon atoms are shown as 326.

Ground Energy Levels in Non-Driven Basis

An energy diagram of the electron ground-state orbital of the W defect including various spin-1 states are illustrated as 400 in FIG. 4. The three ground-state spin-1 states are illustrated as $|0\rangle$ (402), $|+\rangle$ (406) and $|-\rangle$ (404). At an external magnetic field of B=0, clock transitions form between the three spin-1 levels. Spin manipulation in this basis consists of resonantly exciting magnetically allowed transitions such as $|0\rangle \leftrightarrow |-\rangle$ (not shown in FIG. 4), $|0\rangle \leftrightarrow |+\rangle$ (arrow 412 in FIG. 4) and $|+\rangle \leftrightarrow |-\rangle$ (arrow 414 in FIG. 4).

The avoided-crossing energy splitting between the $|+\rangle$ and $|-\rangle$ spin states are generated as a result of transverse zero-field splitting (ZFS) intrinsic to the example spin system's single mirror plane symmetry, as shown in the crystal lattice structure 320 of FIG. 3. Such a transverse ZFS provides reduced sensitivity and robustness of the defect spin system to magnetic noise near zero external magnetic field. The energy splitting between the $|+\rangle$ and $|-\rangle$ spin states is twice the transverse ZFS.

Figure 5:
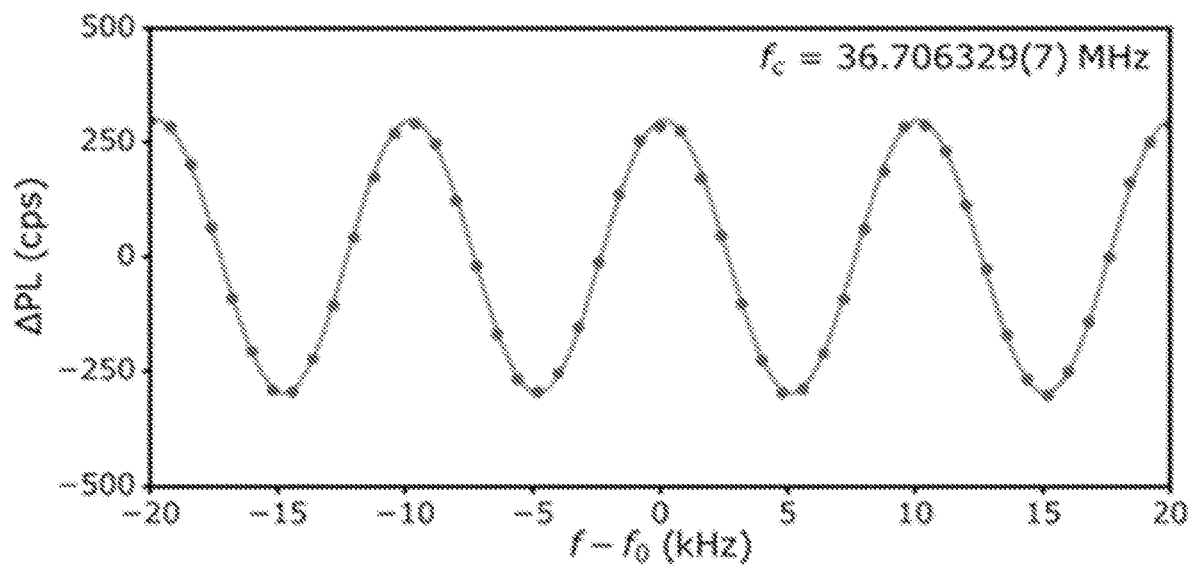
FIG. 5 shows an example Ramsey interferometry for determining an energy splitting between the spin states in FIG. 4.

This transverse ZFS, with a magnitude denoted as E, may be measured in various manners. For example, such an energy splitting may be accurately determined using Ramsey interferometry of the $|+\rangle \leftrightarrow |-\rangle$ transition. As shown below, a central component of the decoherence-protection protocol presented disclosed herein by the continuous dressing drive applied on resonance with the $|+\rangle \leftrightarrow |-\rangle$ spin transition. As such, detuning of the dressing drive frequency from the zero field resonance of $|+\rangle \leftrightarrow |-\rangle$ can degrade the dressed spin coherence properties, and thus the resonance frequency of this transition must be determined to a relatively high accuracy and precision. Ramsey interferometry at B=0 on this transition can be performed to provide such determination. For example, Ramsey fringes can be measured by preparing the spin system into a superposition state $$\frac{|+\rangle + |-\rangle}{\sqrt{2}}$$

while sweeping a probe microwave pulse detuning and observing the spin projection after a free precession time of 100 μs, as shown in FIG. 5. The free precession time may be chosen to provide sufficient frequency resolution while maintaining enough readout signal. The true resonance can be obtained by extracting the pulse detuning at which the spin does not precess in the rotating frame. For an example kh divacancy, this resonance is accurately determined to be at $\omega/(2\pi)=36.706329(7)$ MHz, thereby establishing the magnitude of the transverse zero field splitting E as half of that value, $E/(2\pi)=18.353164(4)$ MHz.

Generation of the Decoherence-Protected Subspace

In some implementations, a three-axis electromagnet for vector control of the external magnetic field may be used to allow for access of the zero-field regime (as well as producing controlled non-zero magnetic fields along, for example, the Cartesian axes of the spin system shown by 330 in FIG. 3).

At B=0, a magnetically allowed spin transition can be driven between the upper two spin states, $$|+\rangle = \frac{1}{\sqrt{2}}(|+1_z\rangle + |-1_z\rangle) \text{ and } |-\rangle = \frac{1}{\sqrt{2}}(|+1_z\rangle - |-1_z\rangle)$$

(where $|\pm 1_z\rangle$ denote the spin $m_s=\pm 1$ sublevels in a $S_z$ basis), by way of the nonzero Hamiltonian matrix elements $\langle \pm|B_z S_z|\mp\rangle$. Such spin transition can be driven resonantly between $|+\rangle$ and $|-\rangle$ states at with a magnetic drive with frequency equal or near twice the transverse ZFS of, for example, at $2E/(2\pi)=36.706329(7)$ MHz.

Under a sufficiently strong continuous resonant magnetic field drive with Rabi frequency $\Omega$, the $|\pm\rangle$ spin levels hybridize with the incident microwave drive and undergo an Autler-Townes splitting (with more details provided below in the supplemental disclosure) to form dressed spin states $|\pm 1\rangle$ with energy levels offset from that of $|+\rangle$ or $|-\rangle$ by $\pm\Omega/2$. These dressed states are shown in 401 of FIG. 4 as $|+1\rangle$ (420, 424) and $|-1\rangle$ (422, 426). The lower Autler-Townes doublet (424 and 426 of FIG. 4) is inaccessible due to suppressed magnetic driving of $|0\rangle \leftrightarrow |-\rangle$ (described below in the supplemental disclosure). The Autler-Townes doublet and dressed states 420 and 422 and the $|0\rangle$ state (402) of FIG. 4 thus form the driven or dressed basis for the decoherence-protected subspace of a qubit under the continuous resonant hybridization drive magnetic field.

Figure 6:
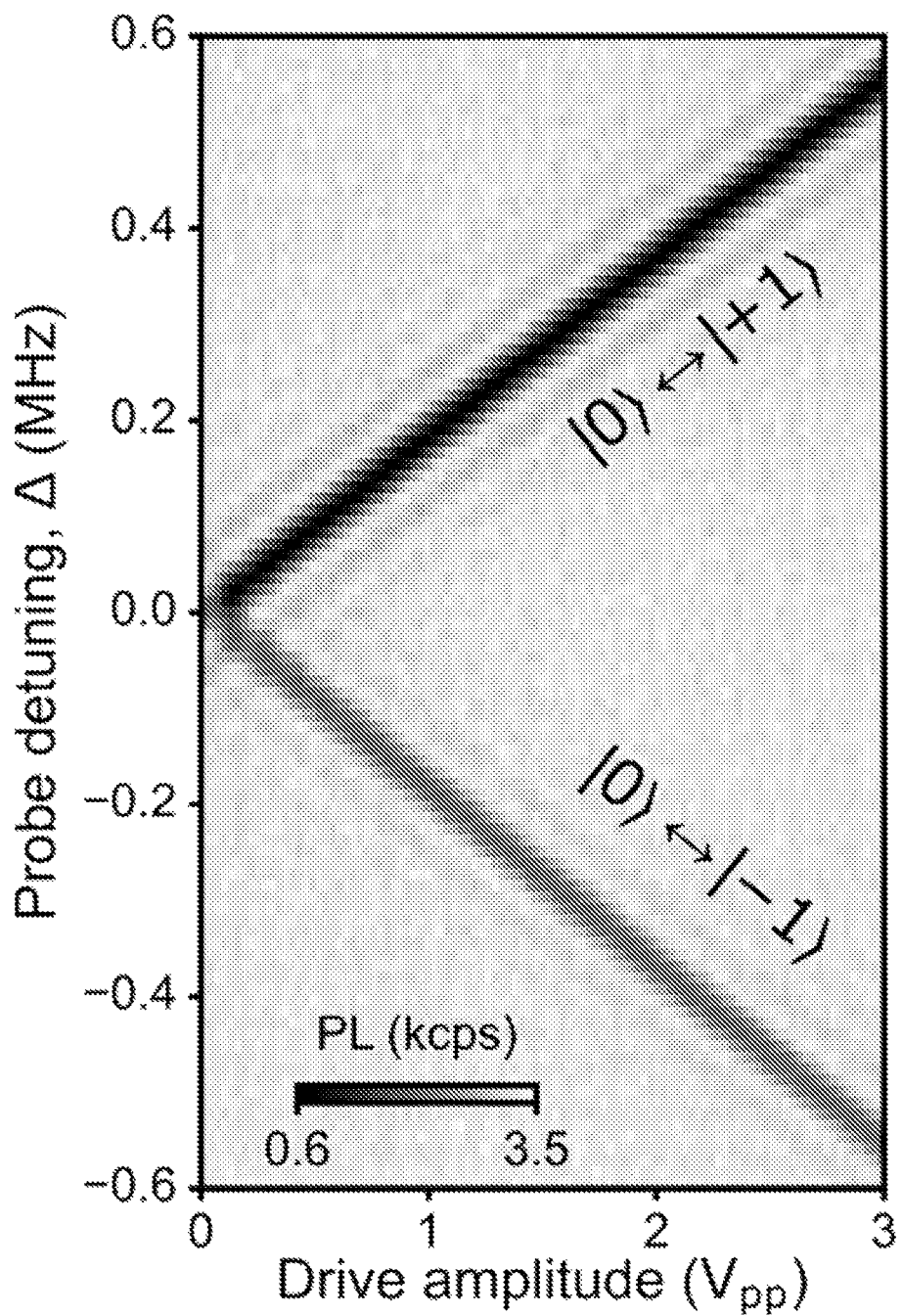
FIG. 6 shows an example Autler-Townes energy splitting of the spin states of FIG. 4 when resonantly driven by an electro-magnetic field.

The dressed states 420 and 422 of FIG. 4 may be probed by applying a weaker microwave probe pulse in the presence of the continuous resonant hybridization drive magnetic field and sweeping its frequency detuning $\Delta$ from the $|0\rangle \leftrightarrow |+\rangle$ transition frequency. An example is shown in FIG. 6. In particular, FIG. 6 shows a pulsed optically detected magnetic resonance (ODMR) resolving the Autler-Townes splitting of the kh divacancy ground-state spin under the continuous drive resonant with the $|+\rangle \leftrightarrow |-\rangle$ spin transition. Here, $\Delta$ represents the microwave probe frequency detuning from the $|0\rangle \leftrightarrow |+\rangle$ resonance frequency.

In some implementations, the Rabi frequency (or amplitude) for the resonant hybridization drive field may be determined to mitigate higher-order energy dispersion components (details are given in the supplemental disclosure below). For the example system above, the Rabi frequency of the resonant hybridization drive field may be chosen as around $\Omega/(2\pi)=350$ kHz.

Quantum Information Operations in the Decoherence-Protected Subspace

Figure 7:
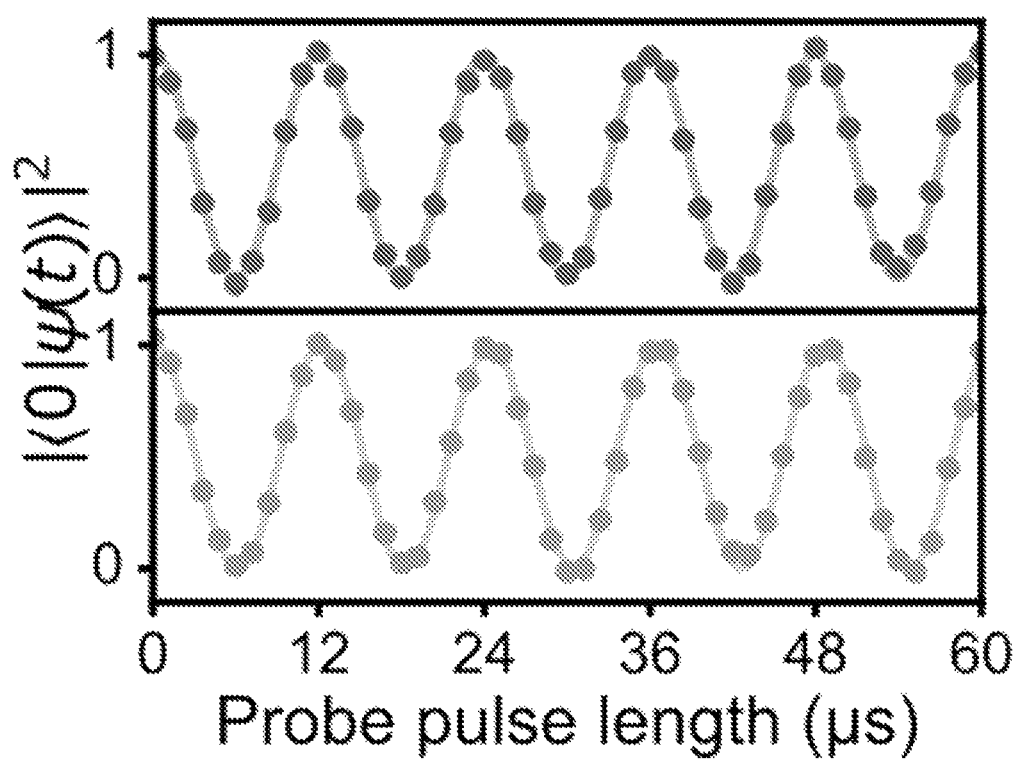
FIG. 7 shows an example coherent control of spin states of an electron spin in a decoherence-protected subspace.
Figure 8:
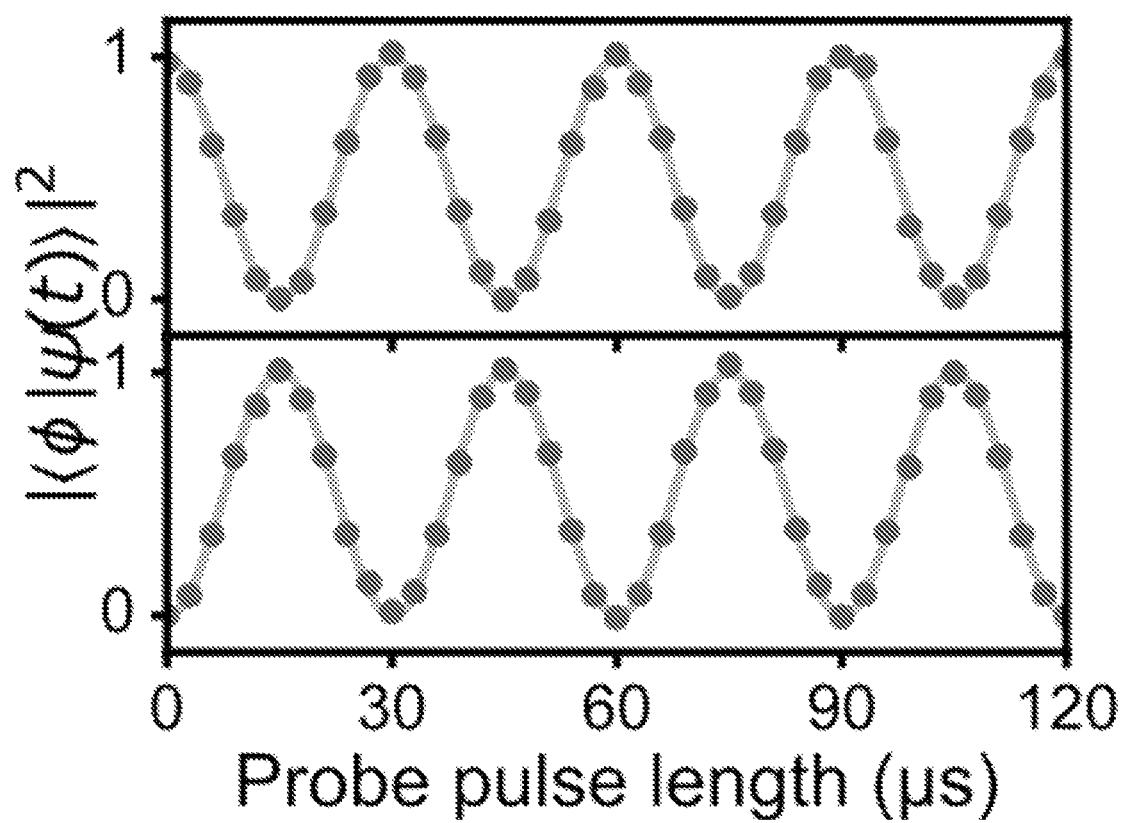
FIG. 8 shows another example coherent control of spin states of an electron spin in a decoherence-protected subspace.

Once the spin system above is driven into to decoherence-protected subspace, coherent control and quantum information operations within the decoherence-protected subspace may be performed. For example, a coherent control of the dressed spin-1 system may be achieved by coherently driving $\Delta m_s=\pm 1$ transitions $|0\rangle \leftrightarrow |\pm 1\rangle$ with ac magnetic fields (magnetically allowed), as shown in FIG. 7, and a $\Delta m_s=\pm 2$ transition $|+1\rangle \leftrightarrow |-1\rangle$ with ac electric fields (electrically allowed), as shown in FIG. 8. Specifically, FIG. 7 shows magnetically driven Rabi oscillations between $|0\rangle$ and $|+1\rangle$ (upper panel of FIG. 7) and $|0\rangle$ and $|-1\rangle$ (lower panel of FIG. 7) states after applying a microwave pulse resonant with the transitions indicated by arrows 434 and 436 in FIG. 4. Likewise, FIG. 8 shows electrically driven Rabi oscillations between the $|+1\rangle$ and $|-1\rangle$ states after applying a microwave pulse resonant with the transition indicated by arrow 430 in FIG. 4. To ensure the spin rotation is in the basis $\{|+1\rangle, |-1\rangle\}$, a spin rotation is varied in the pulse sequence and readout of $|+1\rangle$ ($\varphi=+1$) (upper panel of FIG. 8) and $|-1\rangle$ ($\varphi=-1$) (lower panel of FIG. 8) is simultaneously performed.

Enhancement of Decoherence-Protection

Figure 9:
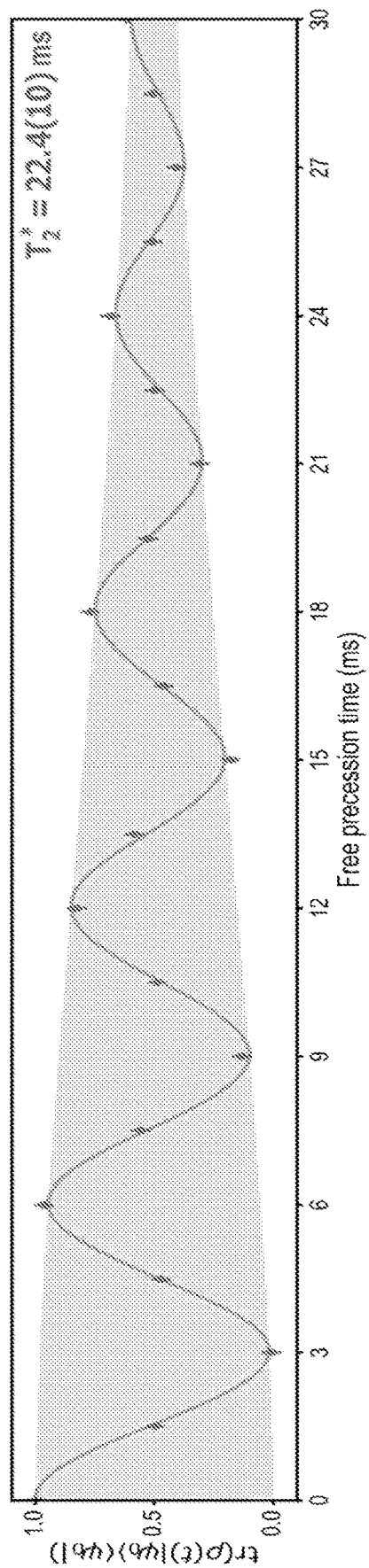
FIG. 9 shows an example Ramsey free precession of an electron spin in a decoherence-protected subspace under a zero external magnetic field.
Figure 10:
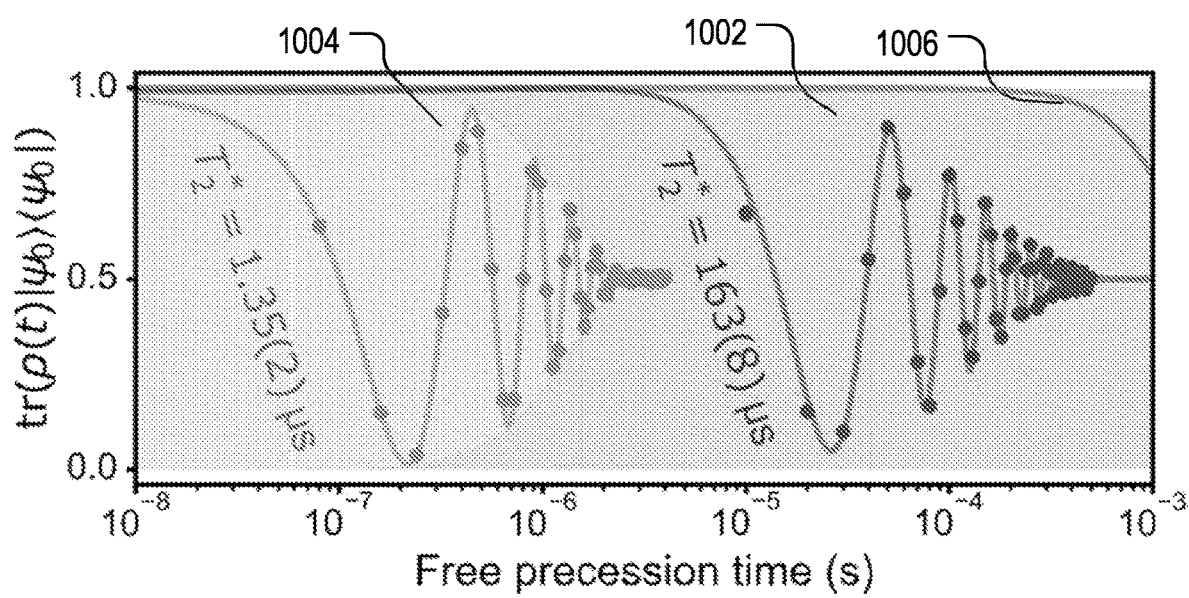
FIG. 10 shows a comparison of example Ramsey free precessions of an electron spin in a decoherence-protected subspace under zero external magnetic field, in an undriven basis under zero external magnetic field, and in the undriven basis under a non-zero external magnetic field.

To show the effect of decoherence improvement in the decoherence-protected subspace, the energy inhomogeneity of this driven spin system is quantified by preparing a superposition $$|\psi_0\rangle = \frac{1}{\sqrt{2}}(|+1\rangle + |-1\rangle)$$

in the decoherence-protected subspace and executing a Ramsey free precession sequence. A microwave detuning of +166.6 Hz is added to increase visibility of the decay envelope. With active feedback procedures in place (described in more detail below), a $T_2^*$ spin inhomogeneous dephasing time in this basis is determined to be 22.4 milliseconds, as shown in FIG. 9 (and 1106 of FIG. 10). Such a inhomogeneous dephasing time is over four orders of magnitude longer than the value obtained for the same kh divacancy at external magnetic field of $B_z$=1.2 mT without the dressing drive and more than two orders of magnitude longer than the undriven inhomogeneous dephasing time at the B=0 of the clock transition, as shown in FIG. 10. In particular, as shown by 1002 of FIG. 10, Ramsey free precession of the spin states $$|\psi_0\rangle = \frac{1}{\sqrt{2}}(|0\rangle + |+\rangle)$$

prepared at B=0 when encoded outside of the decoherence-protected subspace exhibits a dephasing time of 163 microseconds. As shown by 1004 of FIG. 10, the superposition state $$|\psi_0\rangle = \frac{1}{\sqrt{2}}(|0\rangle + |+1_z\rangle)$$

at $B_z$=1.2 mT exhibits a noticeably shortened spin dephasing time of 1.35 microseconds.

Figure 11:
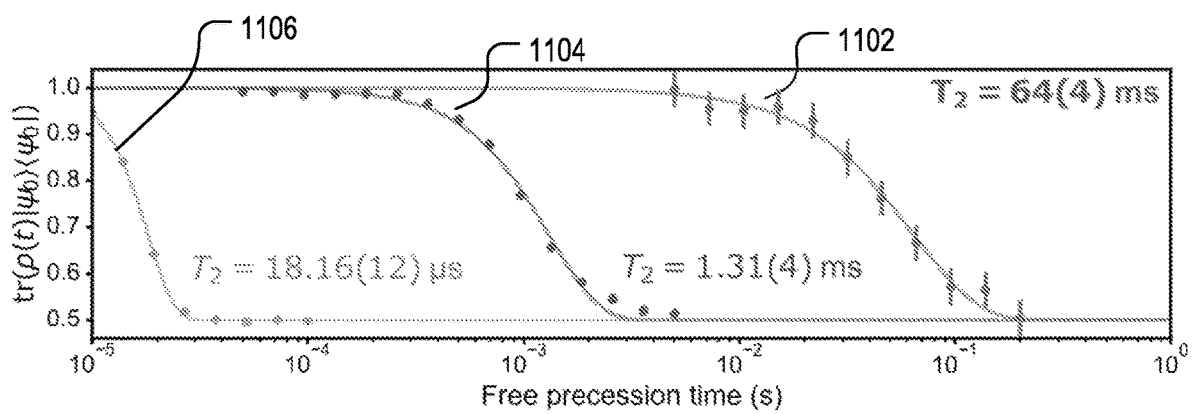
FIG. 11 shows example Hahn echo free precession of a spin in various conditions.

Moreover, by adding a single refocusing pulse, the lifetime of the superposition state $$|\psi_0\rangle = \frac{1}{\sqrt{2}}(|+1\rangle + |-1\rangle)$$

when prepared in the decoherence-protected subspace at B=0 mT is further extended to a $T_2$ Hahn-echo spin coherence time of 64 milliseconds, as shown by 1102 of FIG. 11. In comparison, the spin state $$|\psi_0\rangle = \frac{1}{\sqrt{2}}(|0\rangle + |+\rangle)$$

outside of the decoherence-protected subspace at B=0 mT exhibits a $T_2$ Hahn-echo spin coherence time of 1.31 milliseconds (1104 of FIG. 11) and the spin state $$|\psi_0\rangle = \frac{1}{\sqrt{2}}(|0\rangle + |+1_z\rangle)$$

at $B_z$=1.2 mT exhibits a shortened $T_2$ Hahn-echo spin coherence time of 18.16 microseconds (1106 of FIG. 11).

Both the $T_2$ and $T_2^*$ time values for the $$|\psi_0\rangle = \frac{1}{\sqrt{2}}(|+1\rangle + |-1\rangle)$$

spin state in the decoherence-protected subspace are among the longest times measured for an optically addressable electron spin, regardless of isotopic purity of the host. These increases are a direct result of reduced energy inhomogeneity of the spin in the decoherence-protected subspace, combined with active feedback (with details given below).

Physical Mechanisms for Decoherence-Protection Enhancement

The decoherence-protection enhancement described above is a direct result of reduced energy inhomogeneity of the spin system in the decoherence-protected subspace. For example, energy dispersion of the spin levels as a function of magnetic field is flatted significantly in the decoherence-protected subspace. As such, the effect of energy inhomogeneity of the dressed spin levels as induced by magnetic noises is significantly reduced, leading to suppressed dephasing caused by magnetic noises, which are typical limiting decoherence channels in many electron spin systems.

Figure 12:
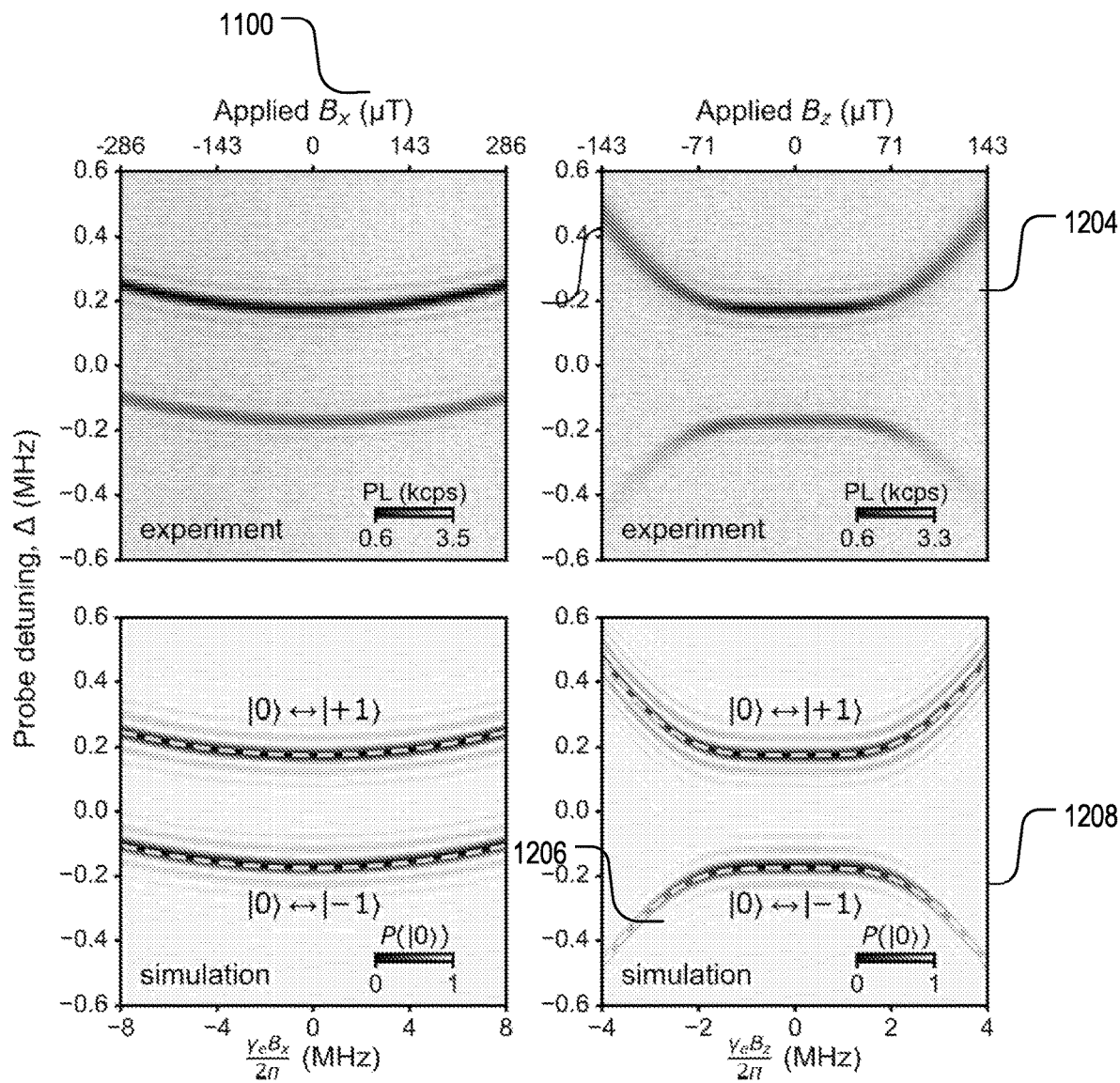
FIG. 12 shows example magnetic energy dispersion of a spin system.

In particular, the dispersion relation of the divacancy ground-state spin becomes non-trivial under the continuous dressing drive resonant with the $|+\rangle \leftrightarrow |-\rangle$ transition, and acquires both quadratic and quartic dependences on magnetic field (with details provided in the supplemental disclosure below). The magnetic energy dispersion relation can be determined by applying a static magnetic fields along the Cartesian x- and z-axes of the spin system (see 330 of FIG. 3) while scanning the frequency detuning Δ of a probe drive, as shown in 1202 and 1204 of FIG. 12, respectively. In particular, 1202 and 1204 of FIG. 12 show optically measured spin resonance spectra of the driven $|\pm 1\rangle$ states over a range of applied x-axis (1202) and z-axis (1204) magnetic fields. Unequal photoluminescence contrast between the two resonance branches is a result of the contrast recovery procedure, and is not indicative of unequal transition probabilities) between $|0\rangle \leftrightarrow |+1\rangle$ and $|0\rangle \leftrightarrow |-1\rangle$. Δ is the probe frequency detuning from the $|0\rangle \leftrightarrow |+\rangle$ resonance frequency. In 1204, inhomogeneous broadening of the resonances is observed at high z-axis fields, where the spin is no longer fully encoded in the decoherence-protected subspace. However, for both x-axis and z-axis fields, the magnetic energy dispersion is significantly flat in the field range that is relevant to environmental magnetic noises.

The rotational symmetry of the system about the z-axis leads to indistinguishable effects from x- and y-axis fields (see supplementary disclosure below). The resulting frequencies of the $|0\rangle \leftrightarrow |\pm 1\rangle$ spin resonances provide spectral response of the driven/dressed spin system's to magnetic fields. In FIGS. 12, 1206 and 1208 show calculated magnetic energy dispersion using an analytical model of the driven/dressed spin system using Floquet analysis (dashed lines) alongside a numerical model through spin-1 master equation simulations (see supplementary disclosure below). The calculated dispersion from these analysis and model matches the experimental measurements, as shown by a comparison between 1202 and 1206, and 1204 and 1208 of FIG. 12.

Figure 13:
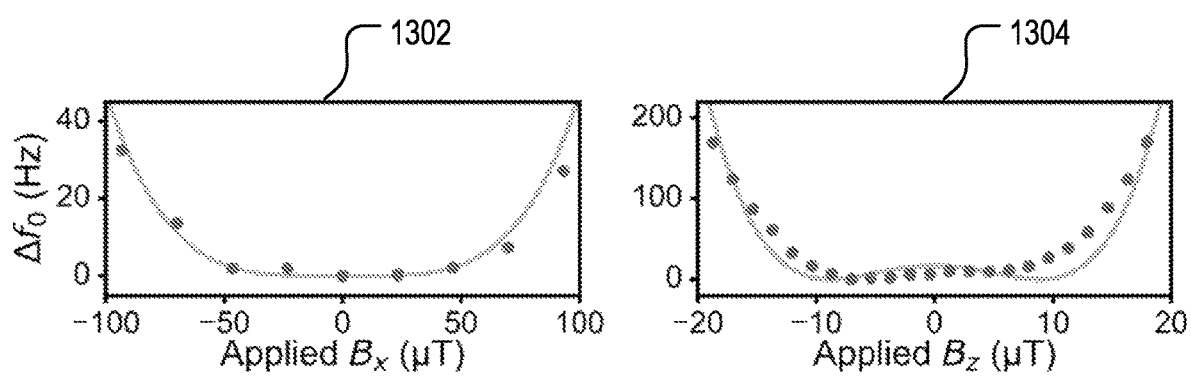
FIG. 13 shows an example fine scan of magnetic energy dispersion of a spin system.

The primary source of magnetic noises in the spin system above may be from the nuclear spin bath of the solid-state host, represented by a simplified isotropic magnetic fluctuator with an estimated fluctuation magnitude at the kh divacancy of 13 µT (see supplementary disclosure below), which lies in a substantially flat portion of the dispersion around 0 magnetic field in 1202 and 1204 of FIG. 12. Fine spectral scans of the electrically driven $|\pm 1\rangle \leftrightarrow |-1\rangle$ transition using Ramsey interferometry in 1302 and 1304 of FIG. 13 for x-axis and z-axis magnetic field confirm the high degree of insensitivity in this range of the nuclear spin bath fluctuator. The flattening of the magnetic dispersion in the driven/dressed basis provides the primary mechanism for the insensitively of the spin to the magnetic noises and the significantly increased spin coherence times.

Besides reduced sensitivity to magnetic noises in the driven spin basis, the driven spins are also insensitive to electric noises and temperature fluctuations. For example, the effect of electric noise and temperature fluctuations on spin inhomogeneous dephasing in the decoherence-protected subspace can be understood by applying analytical energy dispersion relations. Electric and temperature fluctuations may affect the axial and transverse zero-field splitting magnitudes, as well as a corresponding detuning of the dressing drive from the resonance frequency ω=2E. A first-order sensitivity to electric field noise of undriven spin at B=0 may be used to quantify the magnitude of electric field noise present in the system (see supplementary disclosure below). In the decoherence-protected subspace, a first-order protection is provided against fluctuations in the zero-field splitting magnitudes, resulting in increased robustness against electric field noise and temperature shifts. This leads to a reduction of electrically induced spin energy inhomogeneity by nearly two orders of magnitude (see supplemental disclosure below), and diminishes electric field contributions in limiting the spin coherence in the decoherence-protected subspace. A further reduction of electric field contributions to decoherence may emerge by applying a dc electric field to deplete fluctuating charges, leading to further elimination of electric field noise in the spin system above.

Feedback for Compensating Amplitude Drift in Dressing Drive Field

The amplitude of the resonant dressing drive field may drift may induce a drift in the energy splitting between the $|+\rangle$ and $|-\rangle$ states in the dressed subspace. The energy dispersion relations in the driven basis show that the spin's energy levels depend linearly on the dressing drive Rabi frequency. Hence, amplitude drifts of the dressing drive and corresponding fluctuations in the Rabi frequency $\delta\Omega$ introduce first-order energy inhomogeneity of the dressed spin levels and cause shortening of the inhomogeneous dephasing time $T_2^*$. Such amplitude drift may occur on a slow time scale. To reduce such effect from the drifting amplitude of the dressing field, active feedback may be implemented to compensate for the driving amplitude drift. By evaluating an error signal derived from Ramsey free precession of the dressed spin, the amplitude drift can be measured and corrected on the order of, for example 10-100 Hz in the spin resonance frequency, consistent with the 30-300 ppm/° C. stability of the dressing drive oscillator.

Figure 14:
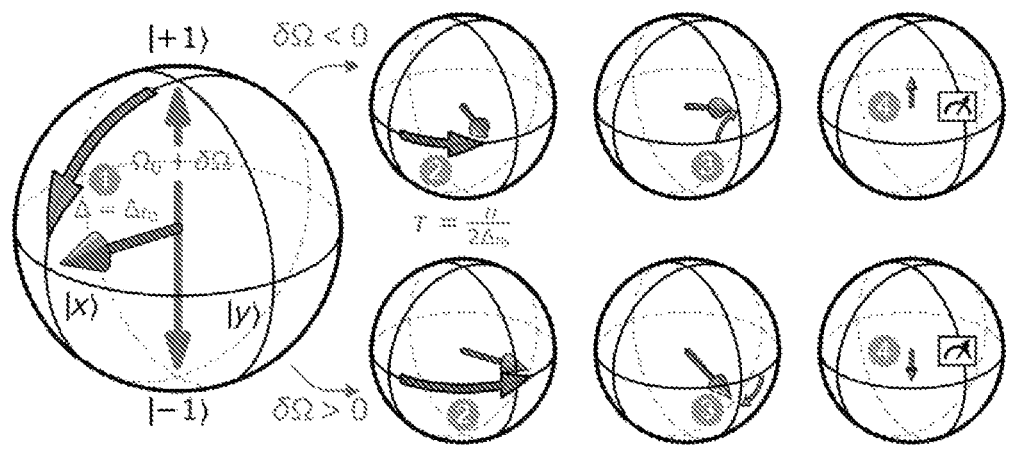
FIG. 14 shows an example process for generating an error signal associated with an amplitude drift of a resonant dressing field for a spin system on a spin Bloch sphere.

In particular, the feedback mechanism for compensating driving amplitude drift as shown in the block sphere illustration of FIG. 14 involves optically initializing the spin into $|0\rangle$, applying the dressing drive, and rotating to $|+1\rangle$. A superposition $$|x\rangle = \frac{1}{\sqrt{2}}(|+1\rangle + |-1\rangle)$$

is then prepared in the dressed basis with a $\pi/2_x$ probe pulse that is detuned by a quantity $\Delta_{fb}$ from the desired resonance $\Omega_0$. Next, a free evolution time $T_{fb}$, is chosen so that $\Delta_{fb}\tau_{fb}=\pi/2$, which under no fluctuations is a $\pi/2_z$ rotation and causes the spin to evolve to $$|y\rangle = \frac{1}{\sqrt{2}}(|+1\rangle + i|-1\rangle).$$

A final $-\pi/2_x$ pulse rotates the spin into the y-z plane, where it is then projected along the z-axis to produce the error signal. An ideal, unperturbed resonance frequency corresponds to zero error, while positive or negative $\delta\Omega$ correspond to negative and positive error signals, respectively. A simple proportional feedback based on this error signal is then applied to the spin manipulation frequency at a period of one minute. For example, $\Delta_{fb}/(2\pi)$ may be chosen at 16.66 Hz and $\tau_{fb}$, may be chosen at 15 ms to retain sensitivity to 30 Hz fluctuations in $\Omega/(2\pi)$ while maintaining enough signal to efficiently obtain an error signal.

Figure 15:
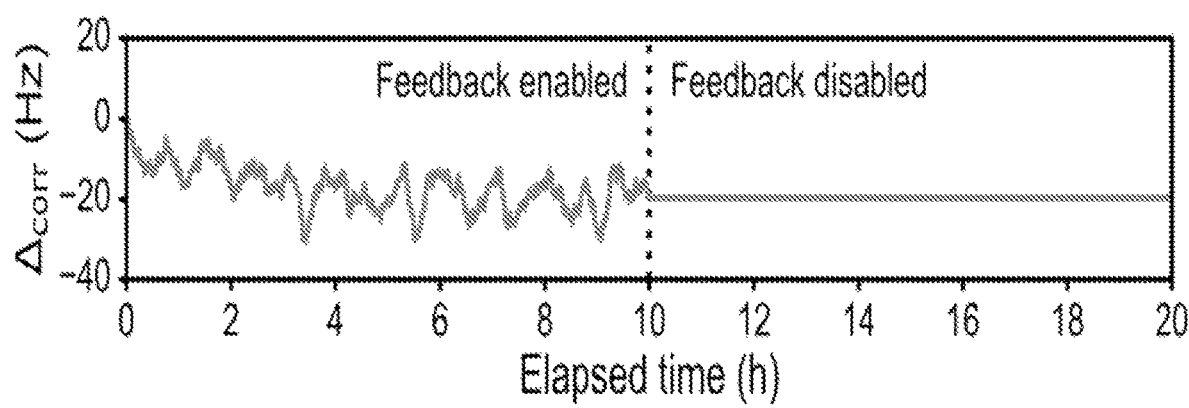
FIG. 15 illustrates an example showing time scales and ranges of amplitude shift of a resonant dressing field in a spin system that can be corrected by active feedback.
Figure 16:
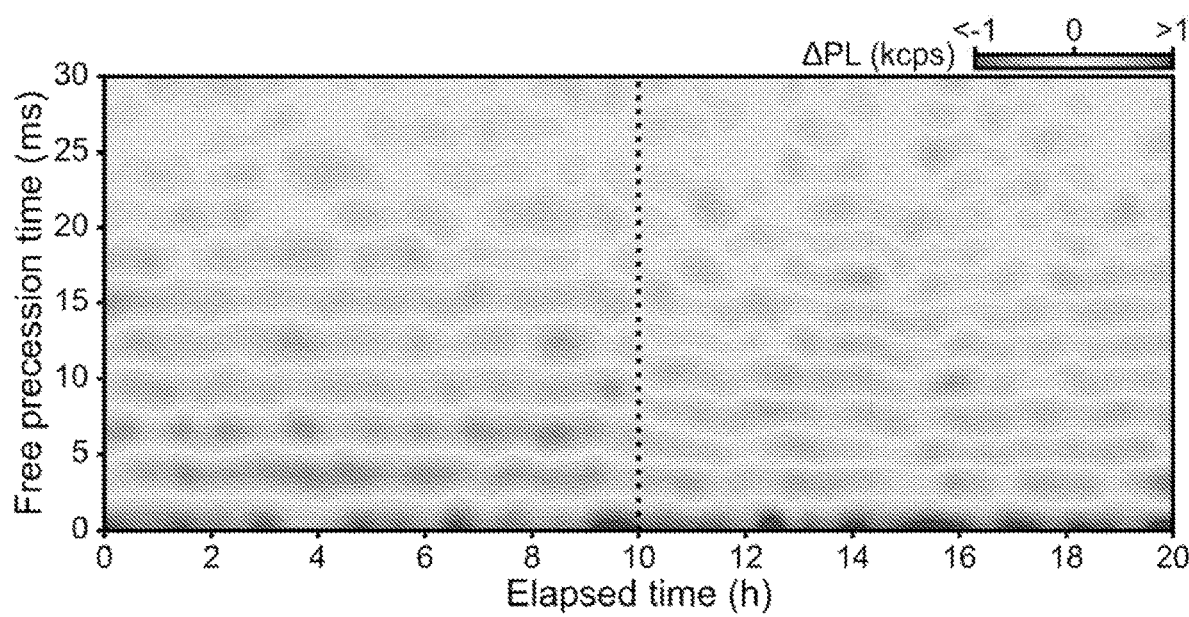
FIG. 16 illustrates an example Ramsey interferometry over time with and without an active feedback to compensate amplitude shift of a resonant dressing field for a spin system.
Figure 17:
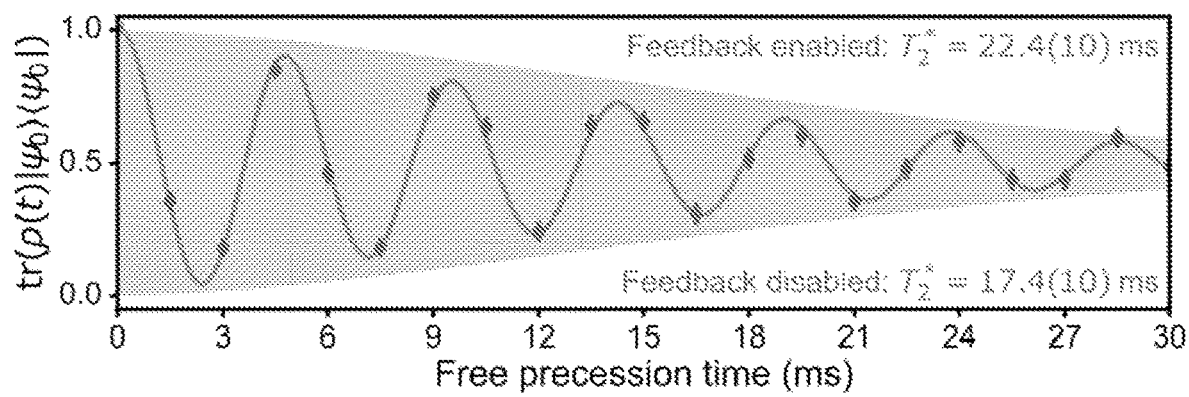
FIG. 17 illustrates an example Ramsey interferometry showing effectiveness of an active feedback to compensate amplitude shift of a resonant dressing field for a spin system.

The feedback mechanism above can be evaluated by, for example, measuring Ramsey free precession of the state $$|\psi_0\rangle = \frac{1}{\sqrt{2}}(|+1\rangle + |-1\rangle)$$

with and without the feedback enabled, as shown in FIGS. 15-17. With active feedback enabled, $T_2^*$ of 22.4 $m_s$ is measured. When the feedback is disabled, this value shortens to 17.4 ms as the dressing drive Rabi frequency inhomogeneity suppresses the spin's coherence on the timescale of hours (as shown in FIG. 17). FIG. 15 shows an range of the error signal in drive Rabi frequency during 0-10 hours when the feedback is enabled. Such error signal is applied for corrective detuning of the frequency of the microwave drive resonant with $|+1\rangle \leftrightarrow |-1\rangle$. In FIG. 16, stabilization of Ramsey free precession of the superposition $$|\psi_0\rangle = \frac{1}{\sqrt{2}}(|+1\rangle + |-1\rangle)$$

with active spin resonance feedback is shown. Specifically, ten free precession acquisition iterations, each with a duration of 49 seconds, are averaged into one sampled point, while a ten-second feedback process is run every minute. As shown in FIG. 16, while active feedback is applied (0-10 hours), the observed Ramsey fringes are stable at the chosen detuning of +166.6 Hz. When active feedback is disabled (10-20 hours), slow drifts in the dressing drive Rabi frequency shift the effective detuning of the microwave pulse used to prepare the spin superposition. Interpolation applied to emphasize fringe locations.

The feedback protocol above thus significantly mitigated the effects of amplitude drift in the dressing drive field and noise sources intrinsic to the host crystal remain as the limiting factor for spin coherence in the decoherence-protected subspace. The feedback mechanism above also applies to mitigating dressing drive frequency drift.

Quantum Information Readout

The quantum states in the decoherence-protected subspace S' can be mapped to the undriven basis by removing the hybridization drive field. In some implementations, the removal can be performed non-adiabatically. For example, the drive filed may be removed on a faster (e.g., 10 times faster) time scale than the energy splitting between the $|+\rangle$ and $|-\rangle$ spin states. The quantum states can then be read out by rotating the mapped quantum state into the $\{|0\rangle,|+\rangle\}$ basis, and optically probing the spin population in $|0\rangle$ (see supplementary disclosure below).

Implications

In the example implementations above, an increase in inhomogeneous dephasing time by over four orders of magnitude and a thousand-fold increase in Hahn-echo coherence time of a single kh divacancy electron spin under the effect of a single continuous microwave dressing drive field are achieved. Such improvements originate from higher-order protection from magnetic, electric, and temperature fluctuations. This arises from driving a spin system with intrinsic protection from magnetic noise. The resulting extended spin $T_2^*$ enables resonant coupling to weakly interacting quantum systems, and facilitates hybrid quantum systems using single divacancy ground-state spins. Even with modest coupling rates to the spin, unity-cooperativity systems can be realized. Furthermore, the viability of this protocol at zero magnetic field may allow for integration of superconducting systems with low critical fields with the spin system. While insensitive to non-resonant magnetic and electric fluctuations, the electron spin is still highly responsive to resonantly applied magnetic and electric control fields. Thus, hybrid quantum systems involving the driven kh divacancy spin can leverage any one of magnetic, electric, and acoustic couplings to the spin. Furthermore, megahertz-scale tuning of the dressed spin energy levels allows for rapid adjustment of interaction strengths with other quantum systems, enabling the spin to be an efficient quantum bus.

The few conditions for successful implementation of this protocol, as described above, allow for immediate extension to other quantum systems with similar undriven energy structures. Spin-1 systems with larger transverse ZFS values can expect to see improvements from higher dressing drive Rabi frequencies, as well as greater suppression of magnetic field fluctuations in the decoherence-protected subspace. Candidate systems include the basally oriented hk divacancy in 4H—SiC ($E/(2\pi)$=82.0 MHz) as well as basally oriented nitrogen-vacancy centers in 4H—SiC ($E/(2\pi)$=103 MHz) and 6H—SiC ($E/(2\pi)$=138 MHz). Strained nitrogen-vacancy centers in diamond with an appreciable transverse ZFS may also stand to benefit from this protocol. Turning to other systems, donor spins in silicon with robust clock transitions, superconducting qubits operated at a degeneracy point, and molecular spins may be driven to produce enhanced coherence.

With an extended spin $T_2^*$, the prospects for unity-cooperativity systems between single solid-state spins and weakly interacting quantum systems may be implemented. Hartmann-Hahn coupling between a pair of spins prepared in the decoherence-protected subspace can mediate two-qubit interactions. By mitigating strain inhomogeneity through material improvements or dynamical decoupling, an ensemble of n driven spins can attain an $n^{1/2}$ enhancement in coupling strength, providing a near-term avenue toward a high-cooperativity coupled system. The qubit in the decoherence-protected subspace may be highly responsive to resonantly applied magnetic and electric control fields, and thus magnetic, electric, and acoustic interactions can be used for coupling. Further, megahertz-scale tuning of the dressed spin energy levels may allow for rapid adjustment of interaction strengths, enabling the spin to be an efficient quantum bus.

Furthermore, this protocol is compatible with additional forms of noise suppression, including isotopic purification, charge depletion, and pulsed dynamical decoupling. The disclosure above shows that the measured spin inhomogeneous dephasing time is consistent with limitations from residual inhomogeneous broadening from nuclear spin bath and charge fluctuations. By reducing the volume density of fluctuating spins in the bath and thus reducing the average dipolar interaction strength between the electron spin and bath nuclear spins the magnitude of inhomogeneous electron spin energy shifts are expected to decrease proportionally. Dynamic techniques such as spin bath driving as mentioned above and spin bath hyperpolarization may further reduce the noise contributions from nuclear spin fluctuations. Charge depletion, which has led to the observation of near-transform-limited optical linewidths in divacancies, can further suppress electric field contributions. The disclosure above shows compatibility with pulsed dynamical decoupling using a Hahn-echo sequence, and higher-order dynamical decoupling sequences may allow for spin coherence to rapidly reach the spin-lattice relaxation limit with relatively few control pulses. As such, the dressing protocol above may be applied across a variety of quantum systems to enable robust, real-world quantum technologies.

Supplemental Disclosure
Spin Properties at High Magnetic Field

Figure 18:
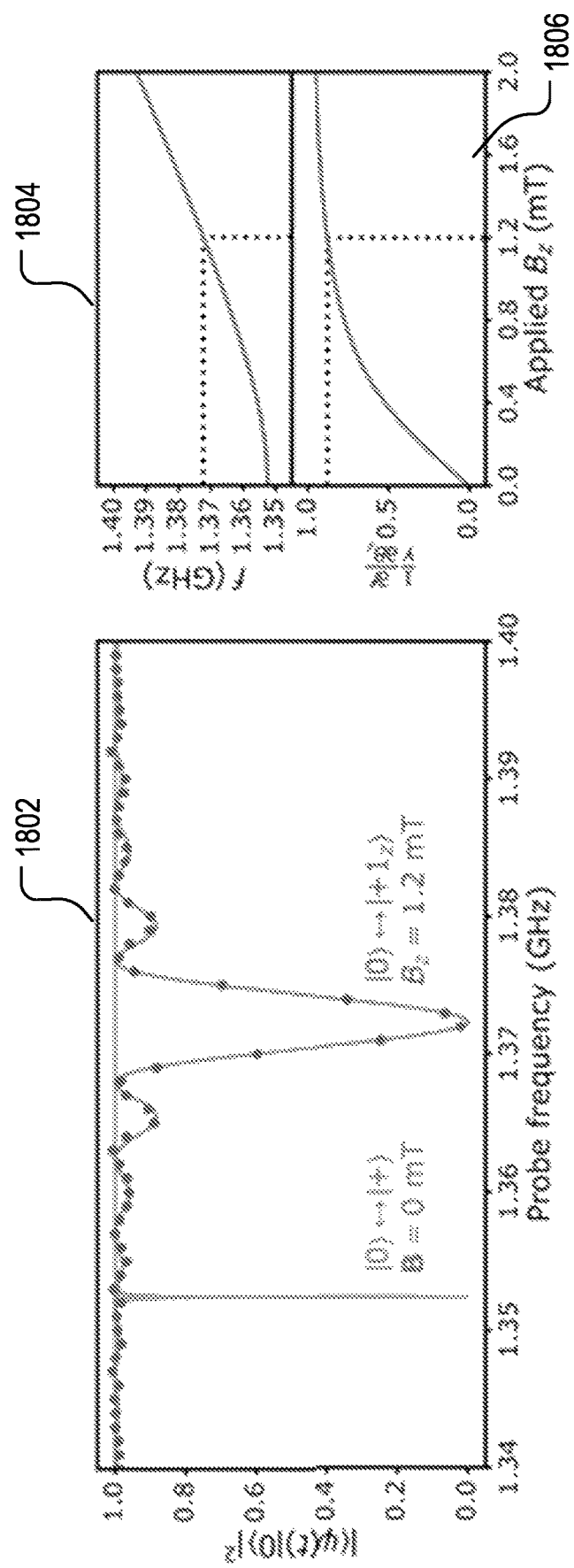
FIG. 18 shows an example spin resonance at non-zero magnetic field.

At high magnetic field, $\gamma|B|>E$, where $\gamma/(2\pi)$=28.024 MHz/mT is the electron spin gyromagnetic ratio, B is the magnetic field pseudovector, and E is the transverse zero-field splitting, the kh divacancy behaves like a c-axis divacancy system. In this regime, the ground-state spin quantization axis is defined by $DS_z^2+\gamma B \cdot S$, where D is the axial zero-field splitting and S is the vector of spin-1 operators, instead of primarily by the combined axial and transverse spin-spin interactions, $S_z^2+S_x^2-S_y^2$. Under these conditions, the spin energy dispersion relation recovers a linear behavior $\delta\omega=\gamma|\delta B_z|$, where $\omega$ is the spin transition energy, and the spin becomes noticeably more susceptible to magnetic fluctuations. As shown above, the kh divacancy has spin coherence properties comparable to c-axis divacancies and nitrogen-vacancy (NV) centers in diamond at high field. This may be accomplished by applying 1.2 mT along the z-axis of the divacancy, thus displacing the upper-most level of the ground-state spin by +20 MHz in frequency, as shown in FIG. 18. FIG. 18 shows pulsed optically detected magnetic resonance of the single kh divacancy ground-state spin at B=0 and $B_z$=1.2 mT (1802), energy dispersion relation of the higher-energy spin resonance as a function of applied z-axis magnetic field (1804), and the first derivative of the dispersion relation with respect to z-axis field (1806). At $B_z$=1.2 mT, the kh divacancy behaves like a c-axis divacancy, since the normalized slope of the energy dispersion relation is about 0.88 (the slope of the energy dispersion relation for c-axis divacancies is 1). To evaluate the spin's susceptibility to environmental fluctuations a superposition between the undriven $|0_z\rangle$ and $|+1_z\rangle$ states is prepared, which are approximately energy eigenstates of $S_z$. The resulting measured values for $T_2^*$ and $T_2$ are consistent with values reported for c-axis divacancies as well as NV centers in diamond, both of which have similar energy structures at this applied magnetic field. Furthermore, this similarity is supported by the normalized slope of the energy dispersion relation of the spin at $B_z$=1.2 mT (1806 of FIG. 18), which is about 0.88 and thus experiences similar degrees of energy inhomogeneity as c-axis divacancies and NV centers in diamond, which have normalized slopes of about 1.

MW-Frequency Magnetic Excitation of the Kh Divacancy Spin at Zero Magnetic Field At zero magnetic field, B=0, the quantization axis of the kh divacancy ground-state spin system is determined by the combined effect of the ground-state axial and transverse zero field splittings, causing the spin system to hybridize from primarily having eigenstates of $S_z$ to those of $S_z^2+S_x^2-S_y^2$. The resulting eigenstates, represented as linear combinations of $S_z$ eigenstates $\{|0_z\rangle, |+1_z\rangle, |-1_z\rangle\}$ are $$|0\rangle = |0_z\rangle,$$
$$|+\rangle = \frac{1}{\sqrt{2}}(|+1_z\rangle + |-1_z\rangle),$$
$$|-\rangle = \frac{1}{\sqrt{2}}(|+1_z\rangle - |-1_z\rangle).$$

Figure 19:
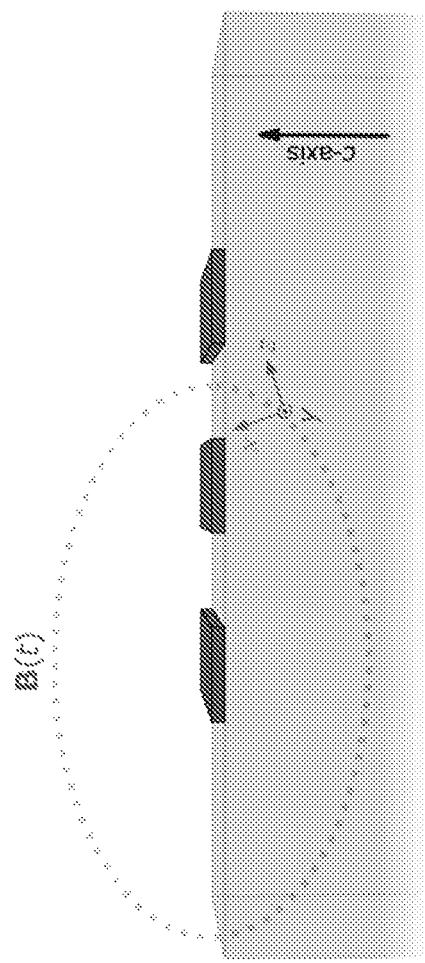
FIG. 19 illustrates sensitivity of a spin system to linearly polarized magnetic field.

The $S_z$ eigenstates are distinct from the $|\pm 1\rangle$ states in the decoherence-protected subspace. Two relevant consequences arise when operating in this eigenbasis. First, the spin transitions between $|0\rangle$ and the other two spin states $|+\rangle$ are no longer mediated by circularly polarized magnetic excitation. Instead, linearly polarized magnetic fields aligned along $S_x$ ($S_y$) selectively drive $|0\rangle \leftrightarrow |+\rangle$ ($|0\rangle \leftrightarrow |-\rangle$). For kh divacancies, the $S_y$ magnetic dipole is oriented in the plane of the crystal, nearly entirely orthogonal to the c-axis, as shown in FIG. 19. FIG. 19 shows a cutaway diagram of the silicon carbide sample corresponding to the optical microscope image in FIG. 3. The wire 306 and capacitor plates 304 are at the top of the sample. The x, y, z vectors in 330 of FIG. 3 and FIG. 19 correspond to the axes in the lattice diagram of 320 in FIG. 3. The kh divacancy spin dipoles are tilted into the silicon carbide basal plane. For the kh divacancy studied in this work, linearly polarized microwave-frequency magnetic fields (dotted line of FIG. 19), B(t), nearly always have appreciable parallel components along the x- and z-axes, but are almost entirely orthogonal to the y-axis. $S_x$ and $S_z$, on the other hand, have significant vector components parallel to the c-axis. This becomes relevant when considering the microwave (MW) excitation emitted by a lithographically patterned wire on the surface of the sample, which primarily generates magnetic fields parallel to the c-axis near the sample surface. This causes the parallel dipole components ($S_x$ and $S_z$) to be driven efficiently, while the orthogonal dipole component $S_y$ cannot be driven efficiently without significant off-resonant driving of the other spin transitions.

Second, in this eigenbasis, a magnetically allowed spin rotation can be driven between the upper two spin levels, $|+\rangle \leftrightarrow |-\rangle$. The $S_z$ magnetic dipole mediates this transition, which is efficiently driven by the lithographically patterned wire. This is crucial to the implementation of the dressing drive, allowing us to resonantly address this transition using a low-power, low-noise microwave-frequency magnetic excitation that induces minimal dissipative Joule heating and perturbation of the sample and spin system.

Floquet Treatment of Autler-Townes Splitting Under a Dressing Drive

The Hamiltonian of the kh divacancy ground-state spin with an applied ac magnetic drive along the z-axis is $$H = DS_z^2 + E(S_x^2 - S_y^2) + \gamma B \cdot S + \Omega \cos(\omega t) S_z$$

where $\Omega$ is the Rabi frequency of the applied drive when on resonance, and $\omega$ is the frequency of the applied drive. $\hbar = 1$ is set throughout for simplicity. Since this Hamiltonian is periodic in time with a period of $T = 2\pi/\omega$, it holds that $$H(t+T) = H(t).$$

Floquet's theorem can be applied to the system and derive the quasienergy spectrum of the ground-state spin, which will serve as stroboscopic energy eigenvalues. In order to understand the Autler-Townes splitting spectrum at zero magnetic field, the special case of B=0, but $\Omega \neq 0$ is considered. A Fourier decomposition of H $$H = \sum_n H_n e^{in\omega t},$$

is first performed, which yields $$H_0 = DS_z^2 + E(S_x^2 - S_y^2),$$

$$H_{\pm 1} = \frac{\Omega}{2} S_z.$$

In the $S_z$ basis, these Fourier-decomposed Hamiltonian components are $$H_0 = \begin{bmatrix} D & 0 & E \\ 0 & 0 & 0 \\ E & 0 & D \end{bmatrix},$$

$$H_{\pm 1} = \begin{bmatrix} \Omega/2 & 0 & 0 \\ 0 & 0 & 0 \\ 0 & 0 & -\Omega/2 \end{bmatrix}.$$

$H_0$ can be diagonalized with a unitary rotation U $$U = \frac{1}{\sqrt{2}} \begin{bmatrix} 1 & 0 & 1 \\ 0 & \sqrt{2} & 0 \\ 1 & 0 & -1 \end{bmatrix}$$

$$H_0' = U^\dagger H_0 U = \begin{bmatrix} D+E & 0 & 0 \\ 0 & 0 & 0 \\ 0 & 0 & D-E \end{bmatrix}.$$

In this basis, $H_{\pm 1}$ is=

$$H_{\pm 1}' = U^\dagger H_{\pm 1} U = \begin{bmatrix} 0 & 0 & \frac{\Omega}{2} \\ 0 & 0 & 0 \\ \frac{\Omega}{2} & 0 & 0 \end{bmatrix}.$$

The Floquet block matrix is then constructed using $H_0'$ and $H_{\pm 1}'$ $$H_F = \begin{bmatrix} \ddots & \ddots & & & \\ \ddots & H_0' + \omega I & H_{+1}' & & \\ & H_{-1}' & H_0' & H_{+1}' & \\ & & H_{-1}' & H_0' - \omega I & \ddots \\ & & & \ddots & \ddots \end{bmatrix} \begin{matrix} |m=+1\rangle \\ |m=0\rangle \\ |m=-1\rangle \end{matrix}$$

where m denotes the Floquet mode index. This yields a Floquet matrix $$H_F = \begin{bmatrix} \ddots & & & & & & & & & \\ & D+E+\omega & 0 & 0 & 0 & 0 & \Omega/2 & & & \\ & 0 & \omega & 0 & 0 & 0 & 0 & & & \\ & 0 & 0 & D-E+\omega & \Omega/2 & 0 & 0 & & & \\ & 0 & 0 & \Omega/2 & D+E & 0 & 0 & 0 & 0 & \Omega/2 \\ & 0 & 0 & 0 & 0 & 0 & 0 & 0 & 0 & 0 \\ & \Omega/2 & 0 & 0 & 0 & 0 & D-E & \Omega/2 & 0 & 0 \\ & & & & 0 & 0 & \Omega/2 & D+E-\omega & 0 & 0 \\ & & & & 0 & 0 & 0 & 0 & -\omega & 0 \\ & & & & \Omega/2 & 0 & 0 & 0 & 0 & D-E-\omega \\ & & & & & & & & & \ddots \end{bmatrix} \begin{matrix} |+,m=+1\rangle \\ |0,m=+1\rangle \\ |-,m=+1\rangle \\ |+,m=0\rangle \\ |0,m=0\rangle \\ |-,m=0\rangle \\ |+,m=-1\rangle \\ |0,m=-1\rangle \\ |-,m=-1\rangle \end{matrix}.$$

The analytical treatment of this system is facilitated by applying the rotating wave approximation, which amounts to only retaining the terms necessary to yield a block diagonal matrix $$H_{F,RWA} = \begin{bmatrix} \ddots & & & & & & & & & \\ & D+E+\omega & & & & & & & & \\ & & \omega & & & & & & & \\ & & & D-E+\omega & \Omega/2 & & & & & \\ & & & \Omega/2 & D+E & & & & & \\ & & & & & 0 & & & & \\ & & & & & & D-E & \Omega/2 & & \\ & & & & & & \Omega/2 & D+E-\omega & & \\ & & & & & & & & -\omega & \\ & & & & & & & & & D-E-\omega \\ & & & & & & & & & & \ddots \end{bmatrix}.$$

A 3×3 matrix can be isolated corresponding to the upper Autler-Townes branch $$H_{F,RWA}^{U} = \begin{bmatrix} \ddots & & & & & & \\ & D+E+\omega & & & & & \\ & & \omega & & & & \\ & & & D-E+\omega & \Omega/2 & 0 & & \\ & & & \Omega/2 & D+E & 0 & & \\ & & & 0 & 0 & 0 & & \\ & & & & & & D-E & \Omega/2 \\ & & & & & & \Omega/2 & D+E-\omega \\ & & & & & & & -\omega \\ & & & & & & & & D-E-\omega \\ & & & & & & & & & \ddots \end{bmatrix},$$

as well as one for the lower branch $$H_{F,RWA}^{L} = \begin{bmatrix} \ddots & & & & & & \\ & D+E+\omega & & & & & \\ & & \omega & & & & \\ & & & D-E+\omega & \Omega/2 & & & \\ & & & \Omega/2 & D+E & & & \\ & & & & & 0 & 0 & 0 \\ & & & & & 0 & D-E & \Omega/2 \\ & & & & & 0 & \Omega/2 & D+E-\omega \\ & & & & & & & -\omega \\ & & & & & & & & D-E-\omega \\ & & & & & & & & & \ddots \end{bmatrix}.$$

For the analysis of Autler-Townes phenomena, the drive is treated as being on resonance, $\omega = 2E$, so that $$H_{F,RWA}^{U} = \begin{bmatrix} D+E & \Omega/2 & 0 \\ \Omega/2 & D+E & 0 \\ 0 & 0 & 0 \end{bmatrix},$$

$$H_{F,RWA}^{L} = \begin{bmatrix} 0 & 0 & 0 \\ 0 & D-E & \Omega/2 \\ 0 & \Omega/2 & D-E \end{bmatrix}.$$

Diagonalizing these systems yields $$H_{F,RWA}^{U} = \begin{bmatrix} D+E+\frac{\Omega}{2} & 0 & 0 \\ 0 & D+E-\frac{\Omega}{2} & 0 \\ 0 & 0 & 0 \end{bmatrix} \begin{array}{l} |+1,u\rangle = \frac{|-,m=+1\rangle + |+,m=0\rangle}{\sqrt{2}} \\ |-1,u\rangle = \frac{|-,m=+1\rangle - |+,m=0\rangle}{\sqrt{2}}, \\ |0,m=0\rangle \end{array}$$

$$H^U_{F,RWA} = \begin{bmatrix} 0 & 0 & 0 \\ 0 & D-E+\frac{\Omega}{2} & 0 \\ 0 & 0 & D-E-\frac{\Omega}{2} \end{bmatrix} \begin{array}{l} |0, m=0\rangle \\ |+1, l\rangle = \frac{|-, m=0\rangle + |+, m=-1\rangle}{\sqrt{2}} \\ |-1, l\rangle = \frac{|-, m=0\rangle - |+, m=-1\rangle}{\sqrt{2}} \end{array},$$

where the energy eigenvalues and corresponding eigenstates of the dressed spin system are shown. In order to understand our observation of only the transitions $|0,m=0\rangle \leftrightarrow |\pm 1, u\rangle$ being allowed. The magnetic drive is primarily aligned along $S_x$ and correspondingly minimized along $S_y$. The result is $B_x \gg B_y$ for any applied MW-frequency magnetic drive. Hence, $S_x$ is the only practically addressable dipole between $|0\rangle$ and any other state. Combined with the fact that at B=0 and $\Omega$=0, H supports spin selection rules with linear polarization, it is concluded that the only spin transition that can be practically realized from $|0\rangle$ is $|0\rangle \leftrightarrow |+\rangle$ in our experimental setup.

Furthermore, in the limit of weak driving $\Omega \ll E$ where multiphoton resonances are suppressed, only states with the same Floquet mode can couple to each other, $$\langle m=m'|m=m''\rangle \approx \delta_{m',m''},$$

where $\delta_{m,n}$ is the Kronecker delta function. With these considerations, it can be determined that the allowed spin transitions in the dressed basis from $|0,m=0\rangle$ are $$|\langle +1,u|S_x|0,m=0\rangle|^2 \neq 0,$$

$$|\langle -1,u|S_x|0,m=0\rangle|^2 \neq 0,$$

while the transitions to the lower branch vanish, $$|\langle +1,l|S_x|0,m=0\rangle|^2 = 0,$$

$$|\langle -1,l|S_x|0,m=0\rangle|^2 = 0,$$

Furthermore, this allows us to confirm that a $\Delta m_s = \pm 2$ spin transition can be actuated by resonant electrical driving, $$|\langle -1,u|(S_x^2-S_y^2)|+1,u\rangle|^2 \neq 0$$

Throughout here and above, $|\pm 1,u\rangle$ as $|\pm 1\rangle$ and $|0,m=0\rangle$ are denoted as $|0\rangle$ for simplicity.

Dressing Drive Non-Adiabatic Transition

Our readout scheme, as detailed above, relies on disabling the dressing drive non-adiabatically and retaining the state through the transition using the sudden approximation. This allows us to perform a mapping from the dressed basis to the undriven basis in a near-deterministic way, without resorting to time-consuming adiabatic change-of-basis procedures. In order to confirm that the sudden approximation is valid, the probability of a spin state $|\psi\rangle$ changing during the non-adiabatic transition is assessed. Such an event is described by a projection operator onto the vector space orthogonal to the initial state $$Q=1-|\psi\rangle\langle\psi|.$$

Evaluating the expectation value of Q after the effect of the non-adiabatic transition unitary evolution operator U is equivalent to the probability of an adiabatic transition $P_A$ $$P_A = \langle \psi | U^\dagger Q U | \psi \rangle.$$

It can be shown that $P_A$ can be equivalently formulated as $$P_A = \tau^2 (\Delta \overline{H})^2,$$

where $\tau$ is the duration over which U occurs and $\Delta \overline{H}$ is the root mean square (RMS) deviation of the energy observable of the system before and after U. Thus, the energy difference between an arbitrary state in the dressed basis and the same one in the bare basis need to be calculated.

Starting with an arbitrary state in the dressed basis $$|\psi\rangle = \alpha|-1\rangle + \beta|+1\rangle,$$

which can also be represented in the bare basis as $$|\psi\rangle = \frac{\alpha}{\sqrt{2}}(|+\rangle - |-\rangle) + \frac{\beta}{\sqrt{2}}(|+\rangle + |-\rangle)$$

$$= \frac{\alpha+\beta}{\sqrt{2}}|+\rangle + \frac{\beta-\alpha}{\sqrt{2}}|-\rangle,$$

Define $$\delta = \frac{\alpha+\beta}{\sqrt{2}} \text{ and } \gamma = \frac{\beta-\alpha}{\sqrt{2}}$$

to obtain $$|\psi_0\rangle = \delta|+\rangle + \gamma|-\rangle.$$

The energy expectation value of the system is then calculated given an arbitrary state with the dressing drive enabled and disabled, given by the system Hamiltonians $H_e$ and $H_d$, respectively, $$\langle \psi | H_e | \psi \rangle = \frac{\Omega}{2}(|\beta|^2 - |\alpha|^2) + D,$$

$$\langle \psi | H_d | \psi \rangle = |\delta|^2(D+E) + |\gamma|^2(D-E)$$

$$= D + E(\alpha^*\beta + \beta^*\alpha).$$

The RMS energy deviation over the transition is $$\Delta \overline{H} = \sqrt{\frac{(\langle \psi|H_e|\psi\rangle - \langle \psi|H_d|\psi\rangle)^2 + (\langle \psi|H_d|\psi\rangle - \langle \psi|H_e|\psi\rangle)^2}{8}}$$

$$= \frac{|\langle \psi|H_d|\psi\rangle - \langle \psi|H_e|\psi\rangle|}{2}$$

$$= \left| \frac{E}{2}(\alpha^*\beta + \beta^*\alpha) - \frac{\Omega}{4}(|\beta|^2 - |\alpha|^2) \right|.$$

In the limit $\Omega \ll E$, the maximal RMS energy change is obtained for any superposition state where $\alpha^*\beta + \beta^*\alpha = 1$ and $|\beta|^2 - |\alpha|^2 = 0$, resulting in $\Delta \overline{H} \approx E/2$. Considering that the dressing drive modulation bandwidth is limited by the arbitrary waveform generator output rise time, which is order 1 nanosecond, the worst-case probability of an adiabatic transition $P_A$ can be determined as $$P_A = \tau^2 (\Delta \overline{H})^2 = (1ns)^2 (2\pi \times 9 \text{ MHz})^2 \approx 0.003$$

The probability of a non-adiabatic transition $P_{NA}$ is at least the negation of this quantity; $P_{NA}=1-P_A \approx 0.997$. Thus, modulation of the dressing drive at nanosecond timescales is non-adiabatic and almost entirely retains the original state vector.

Readout of Dressed Qubit Basis

Optical readout of the kh divacancy ground-state spin is accomplished by exciting its spin-selective optical interface with a tunable narrow-line laser. The A' optical branch is used, which is about 277.9 THz higher in energy than the ground-state triplet $^3A_2$ for low-strain kh divacancies. The fine structure of the A' optical branch consists of three highly spin selective optical transitions, each corresponding to one of the ground-state spin eigenstates at B=0. Given the large (~860 MHz) separation in energy between the $|0\rangle \leftrightarrow |A'_0\rangle$ and $|+\rangle \leftrightarrow |A'_+\rangle$ optical transitions, combined with the ease of manipulating the $|0\rangle \leftrightarrow |+\rangle$ spin transition with linearly polarized MWs generated by the drive wire, a ground-state undriven qubit basis consisting of $|0\rangle$ and $|+\rangle$ may be chosen as working basis to perform readout by exciting the cycling transition $|0\rangle \leftrightarrow |A'_0\rangle$ to determine the population in $|0\rangle$.

In the case of readout for a qubit basis consisting of $|0\rangle$ and one of the driven $|\pm 1\rangle$ states, directly exciting $|0\rangle \leftrightarrow |_0'\rangle$ will also off-resonantly excite $|-\rangle \leftrightarrow |A'_-\rangle$ given the small (~130 MHz) energy difference between the two transitions, significantly reducing the contrast between the bright state $|0\rangle$ and the dark states $|\pm 1\rangle$ and potentially suppressing readout signal-to-noise by up to a factor of 3. This problem is resolved by performing a contrast recovery sequence which combines spin rotations with a non-adiabatic shutoff of the dressing drive described in the preceding subsection. This protocol can be demonstrated on an arbitrary state in the dressed $\{|0\rangle, |+1\rangle\}$ basis $$|\psi\rangle = \alpha|0\rangle + \beta|+1\rangle.$$

By turning off the dressing drive non-adiabatically, the state remains unchanged. In the undriven basis, the state is then expressed as $$|\psi'\rangle = \alpha|0\rangle + \frac{\beta}{\sqrt{2}}(|+\rangle + |-\rangle).$$

A $-\pi/2$ rotation about $S_z$ then produces $$|\psi'\rangle = \alpha|0\rangle + \beta|+\rangle,$$

at which point excitation of $|0\rangle \leftrightarrow |A'_0\rangle$ will yield a high-contrast, low-background measurement of $|\alpha|^2$. A similar sequence can be used when working in the dressed $\{|0\rangle, |-1\rangle\}$ basis, namely by switching to a $+\pi/2$ rotation about $S_z$ after non-adiabatic shutoff of the dressing drive.

When working in the driven $\{|+1\rangle, |-1\rangle\}$ qubit basis, both basis states have components of $|+\rangle$ as well as $|-\rangle$. Since neither $|+\rangle \leftrightarrow |A'_+\rangle$ nor $|-\rangle \leftrightarrow |A'_-\rangle$ are highly cycling transitions, $|0\rangle \leftrightarrow |A'_0\rangle$ is continually used as the readout optical transition. However, since $|\langle 0|\pm 1\rangle|^2=0$ and both states would yield the same photoluminescence, little to no readout contrast will be obtained solely through exciting $|0\rangle \leftrightarrow |A'_0\rangle$. Hence, the aforementioned contrast recovery sequence can be adapted to this basis by considering an initial arbitrary state $$|\psi\rangle = \alpha|-1\rangle + \beta|+1\rangle.$$

A $\pi$ rotation using the $|0\rangle \leftrightarrow |-1\rangle$ transition is then performed $$|\psi\rangle = \alpha|0\rangle + \beta|+1\rangle,$$

at which point the aforementioned contrast recovery sequence can be performed.

Energy Dispersion from $B_z$ Noise Contributions

Considering the driven Hamiltonian with only fluctuations along B $$H = DS_z^2 + E(S_x^2 - S_y^2) + \gamma B_z S_z + \Omega \cos(\omega t) S_z.$$

Set $\gamma=1$ for simplicity in this derivation. Following the Floquet analysis procedure outlined in the subsection entitled "Floquet treatment of Autler-Townes splitting under s dress drive," the Fourier components of this Hamiltonian is obtained $$H_0 = \begin{bmatrix} D+B_z & 0 & E \\ 0 & 0 & 0 \\ E & 0 & D-E_z \end{bmatrix},$$

$$H_{\pm 1} = \begin{bmatrix} \Omega/2 & 0 & 0 \\ 0 & 0 & 0 \\ 0 & 0 & -\Omega/2 \end{bmatrix}.$$

Define $G^2 = B_z^2 + E^2$. Then, $H_0$ can be diagonalized using U $$U = \begin{bmatrix} \frac{B_z - G}{\sqrt{(B_z-G)^2 + E^2}} & 0 & \frac{B_z + G}{\sqrt{(B_z+G)^2 + E^2}} \\ 0 & 1 & 0 \\ \frac{E}{\sqrt{(B_z-G)^2 + E^2}} & 0 & \frac{E}{\sqrt{(B_z+G)^2 + E^2}} \end{bmatrix},$$

$$H_0' = U^\dagger H_0 U$$

$$= \begin{bmatrix} D+G & 0 & 0 \\ 0 & 0 & 0 \\ 0 & 0 & D-G \end{bmatrix}.$$

$H_{\pm 1}$ can also be rotated into this basis $$H_{\pm 1}' = U^\dagger H_{\pm 1} U$$

$$= \begin{bmatrix} \frac{\Omega B_z}{2G} & 0 & -\frac{\Omega E}{2G} \\ 0 & 0 & 0 \\ -\frac{\Omega E}{2G} & 0 & -\frac{\Omega B_z}{2G} \end{bmatrix}$$

$$\approx \begin{bmatrix} 0 & 0 & -\frac{\Omega E}{2G} \\ 0 & 0 & 0 \\ -\frac{\Omega E}{2G} & 0 & 0 \end{bmatrix},$$

where the approximation for $H'_{\pm 1}$ is obtained by assuming $G \gg B_z$. The Floquet matrix is then obtained as $$H_F = \begin{bmatrix} \ddots & & & & & & & & & \\ & D+G+\omega & 0 & 0 & 0 & 0 & -\frac{\Omega E}{2G} & & & \\ & 0 & \omega & 0 & 0 & 0 & 0 & & & \\ & 0 & 0 & D-G+\omega & -\frac{\Omega E}{2G} & 0 & 0 & & & \\ & 0 & 0 & -\frac{\Omega E}{2G} & D+G & 0 & 0 & 0 & 0 & -\frac{\Omega E}{2G} \\ & 0 & 0 & 0 & 0 & 0 & 0 & 0 & 0 & 0 \\ & -\frac{\Omega E}{2G} & 0 & 0 & 0 & 0 & D-G & -\frac{\Omega E}{2G} & 0 & 0 \\ & & & & 0 & 0 & -\frac{\Omega E}{2G} & D+G-\omega & 0 & 0 \\ & & & & 0 & 0 & 0 & 0 & -\omega & 0 \\ & & & & -\frac{\Omega E}{2G} & 0 & 0 & 0 & 0 & D-G-\omega \\ & & & & & & & & & \ddots \end{bmatrix} \begin{array}{l} |+, m=+1\rangle \\ |0, m=+1\rangle \\ |-, m=+1\rangle \\ |+, m=0\rangle \\ |0, m=0\rangle \\ |-, m=0\rangle \\ |+, m=-1\rangle \\ |0, m=-1\rangle \\ |-, m=-1\rangle \end{array}$$

Then, by applying the rotating wave approximation, a block diagonal matrix is constructed as $$H_{F,RWA} = \begin{bmatrix} \ddots & & & & & & & & & \\ & D+G+\omega & & & & & & & & \\ & & \omega & & & & & & & \\ & & & D-G+\omega & -\frac{\Omega E}{2G} & & & & & \\ & & & -\frac{\Omega E}{2G} & D+G & & & & & \\ & & & & & 0 & & & & \\ & & & & & & D-G & -\frac{\Omega E}{2G} & & \\ & & & & & & -\frac{\Omega E}{2G} & D+G-\omega & & \\ & & & & & & & & -\omega & \\ & & & & & & & & & D-G-\omega \\ & & & & & & & & & & \ddots \end{bmatrix} \begin{array}{l} |+, m=+1\rangle \\ |0, m=+1\rangle \\ |-, m=+1\rangle \\ |+, m=0\rangle \\ |0, m=0\rangle \\ |-, m=0\rangle \\ |+, m=-1\rangle \\ |0, m=-1\rangle \\ |-, m=-1\rangle \end{array}$$

allowing us to extract the familiar upper and lower branch matrices $$H_{F,RWA}^U = \begin{bmatrix} D-G+\omega & -\frac{\Omega E}{2G} & 0 \\ -\frac{\Omega E}{2G} & D+G & 0 \\ 0 & 0 & 0 \end{bmatrix},$$

-continued $$H_{F,RWA}^L = \begin{bmatrix} 0 & 0 & 0 \\ 0 & D-G & -\frac{\Omega E}{2G} \\ 0 & -\frac{\Omega E}{2G} & D+G-\omega \end{bmatrix}.$$

Since it has been shown that only the upper Autler-Townes branch is experimentally accessible in the subsection entitled "Floquet treatment of Autler-Townes splitting under s dress drive," only the diagonalization of the upper branch matrix is addressed:

$$H^U_{F,RWA} = \begin{bmatrix} D-G+\frac{\omega}{2} & -\frac{\Omega E}{2G} & 0 \\ -\frac{\Omega E}{2G} & D+G-\frac{\omega}{2} & 0 \\ 0 & 0 & -\frac{\omega}{2} \end{bmatrix} + \frac{\omega}{2}I$$

$$= \begin{bmatrix} D-\Delta & -\frac{\Omega E}{2G} & 0 \\ -\frac{\Omega E}{2G} & D+\Delta & 0 \\ 0 & 0 & -\frac{\omega}{2} \end{bmatrix} + \frac{\omega}{2}I,$$

where $$\Delta = G - \frac{\omega}{2}$$

is defined as the detuning of the dressing drive from the natural resonance. The eigenvalues of this system can then be extracted:

$$\omega_1 = -\omega/2,$$

$$\omega_2 = D - \sqrt{\left(\frac{\Omega E}{2G}\right)^2 + \Delta^2},$$

$$\omega_3 = D + \sqrt{\left(\frac{\Omega E}{2G}\right)^2 + \Delta^2}.$$

For the purposes of understanding the effect of $B_z$ noise contributions, assume no drive detuning is present; $\omega=2E$. The energy difference of the qubit encoded in the decoherence-protected subspace is given by $$|\omega_2 - \omega_3| = 2\sqrt{\left(\frac{\Omega E}{2G}\right)^2 + \Delta^2}$$

$$= 2\sqrt{\left(\frac{\Omega E}{2\sqrt{B_z^2+E^2}}\right)^2 + \left(\sqrt{B_z^2+E^2} - E\right)^2}$$

$$= 2E\sqrt{\left(\frac{\Omega}{2E\sqrt{\left(\frac{B_z}{E}\right)^2+1}}\right)^2 + \left(\sqrt{\left(\frac{B_z}{E}\right)^2+1}-1\right)^2}.$$

A Maclaurin series expansion with respect to $B_z/E$ yields $$|\omega_2 - \omega_3| \approx \Omega - \frac{\Omega}{2}\left(\frac{B_z}{E}\right)^2 + \left[\frac{3\Omega}{8} + \frac{E^2}{2\Omega}\right]\left(\frac{B_z}{E}\right)^4 + O\left[\left(\frac{B_z}{E}\right)^6\right],$$

where the dispersion relation has quadratic and quartic dependences on $B_z/E$. From this, a few conclusions can be drawn:

In the limit $\gamma|B_z|<\Omega$, the dispersion relation takes on a primarily quartic dependence. This provides the highly non-linear suppression of magnetic noise in the regime of small perturbations relative to the dressing drive Rabi frequency.

The transverse zero-field splitting magnitude, E, is directly responsible for the reduction of the effect of z-axis magnetic field fluctuations. Thus, greater E is universally beneficial for the efficacy of the decoherence-protected subspace with respect to suppressing magnetic field noise.

The dressing drive Rabi frequency, $\Omega$, must be balanced in a way so that the zeroth order energy level separation is large enough, while not overly amplifying the quadratic and quartic contributions of z-axis magnetic field fluctuations. In this case, a larger magnitude of E will also allow for a larger range of $\Omega$ to be accessible.

The range of fields that the decoherence-protected subspace can efficiently suppress is approximated by the two nonzero roots of the sum of the quadratic and quartic terms $$-\frac{\Omega}{2}\left(\frac{B_z}{E}\right)^2 + \left[\frac{3\Omega}{8} + \frac{E^2}{2\Omega}\right]\left(\frac{B_z}{E}\right)^4 = 0,$$

which are approximately of order $\Omega$ in the limit $\Omega<<E$. Thus, the dressing drive Rabi frequency can be tuned to allow the decoherence-protected subspace to suppress a smaller or larger range of magnetic field fluctuations, depending on the environmental parameters.

In the demonstration of this coherence protection protocol, $\Omega/(2\pi)=350$ kHz has been chosen, which is very close to the estimated Zeeman contribution of $\gamma|B_z|/(2\pi)=364$ kHz derived in the subsection entitled "Estimation of magnetic field fluctuation magnitude." From our analysis here, larger dressing drive Rabi frequency magnitudes would invariably induce higher spin energy inhomogeneity magnitudes within the range of magnetic field fluctuations, while a smaller Rabi frequency would fail to protect the system from the complete range of magnetic field fluctuations, creating a more linear dispersion relation at the edges of the magnetic field fluctuation range.

Energy Dispersion from $B_x$ Noise Contributions

Considering the driven Hamiltonian, now with only fluctuations along $B_x$:

$$H = DS_z^2 + E(S_x^2 - S_y^2) + \gamma B_x S_x + \Omega \cos(\omega t)S_z.$$

Set $\gamma=1$ for simplicity in this derivation. Immediately, it is seen that the system is rotationally invariant along the z-axis, in that a change of basis $$S_x \rightarrow S_y,$$

$$S_y \rightarrow -S_x,$$

$$B_x \rightarrow B_y,$$

leaves the Hamiltonian unaffected up to a sign change. Thus the derivation for magnetic field applied along the x-axis is considered to be representative of the effect of magnetic fields applied along any axis orthogonal to the z-axis.

Following the same procedure for determining $B_z$ contributions, the Fourier components of the Hamiltonian in the basis diagonal to $H_0$ is obtained. Define $F=D+E$ and $$G^2 = 2B_x'^2 + F^2,$$

$$H_0 = \begin{bmatrix} D & B_x/\sqrt{2} & E \\ B_x/\sqrt{2}_x & 0 & B_x/\sqrt{2} \\ E & B_x/\sqrt{2} & D \end{bmatrix},$$

$$H_{\pm 1} = \begin{bmatrix} \Omega/2 & 0 & 0 \\ 0 & 0 & 0 \\ 0 & 0 & -\Omega/2 \end{bmatrix},$$

$$U = \begin{bmatrix} \frac{\sqrt{2}B_x}{\sqrt{4B_x^2+(F-G)^2}} & \frac{\sqrt{2}B_x}{\sqrt{4B_x^2+(F+G)^2}} & \frac{1}{\sqrt{2}} \\ -\frac{F-G}{\sqrt{4B_x^2+(F-G)^2}} & -\frac{F+G}{\sqrt{4B_x^2+(F+G)^2}} & 0 \\ \frac{\sqrt{2}B_x}{\sqrt{4B_x^2+(F-G)^2}} & \frac{\sqrt{2}B_x}{\sqrt{4B_x^2+(F+G)^2}} & -\frac{1}{\sqrt{2}} \end{bmatrix},$$

and then apply $U$ to $H_0$ and $H_{\pm 1}$, $$H_0' = \begin{bmatrix} \frac{F+G}{2} & 0 & 0 \\ 0 & \frac{F-G}{2} & 0 \\ 0 & 0 & F-2E \end{bmatrix},$$

$$H_{\pm 1}' = \begin{bmatrix} 0 & 0 & -\frac{B_x\Omega}{\sqrt{4B_x^2-(F-G)^2}} \\ 0 & 0 & -\frac{B_x\Omega}{\sqrt{4B_x^2+(F+G)^2}} \\ -\frac{B_x\Omega}{\sqrt{4B_x^2-(F-G)^2}} & -\frac{B_x\Omega}{\sqrt{4B_x^2+(F+G)^2}} & 0 \end{bmatrix}$$

$$\approx \begin{bmatrix} 0 & 0 & -\frac{B_x\Omega}{\sqrt{4B_x^2-(F-G)^2}} \\ 0 & 0 & 0 \\ -\frac{B_x\Omega}{\sqrt{4B_x^2-(F-G)^2}} & 0 & 0 \end{bmatrix},$$

where in the last line $F+G \gg B_x$ is considered to obtain the approximation for $H'_{\pm 1}$. By defining $$\Omega'(B_x) = -\frac{B_x\Omega}{\sqrt{4B_x^2-(F-G)^2}},$$

the full Floquet matrix is then $$H_F = \begin{bmatrix} \ddots & & & & & & & & \\ & \frac{F+G}{2}+\omega & 0 & 0 & 0 & 0 & \Omega' & & & \\ & 0 & \frac{F-G}{2}+\omega & 0 & 0 & 0 & 0 & & & \\ & 0 & 0 & F-2E+\omega & \Omega' & 0 & 0 & & & \\ & 0 & 0 & \Omega' & \frac{F+G}{2} & 0 & 0 & 0 & 0 & \Omega' \\ & 0 & 0 & 0 & 0 & \frac{F-G}{2} & 0 & 0 & 0 & 0 \\ & \Omega' & 0 & 0 & 0 & 0 & F-2E & \Omega' & 0 & 0 \\ & & & & 0 & 0 & \Omega' & \frac{F+G}{2}-\omega & 0 & 0 \\ & & & & 0 & 0 & 0 & 0 & \frac{F-G}{2}-\omega & 0 \\ & & & & \Omega' & 0 & 0 & 0 & 0 & F-2E-\omega \\ & & & & & & & & & \ddots \end{bmatrix} \begin{matrix} |+, m=+1\rangle \\ |0, m=+1\rangle \\ |-, m=+1\rangle \\ |+, m=0\rangle \\ |0, m=0\rangle \\ |-, m=0\rangle \\ |+, m=-1\rangle \\ |0, m=-1\rangle \\ |-, m=-1\rangle \end{matrix}$$

Implement the rotating wave approximation by reducing $H_F$ down to a block diagonal matrix:

$$H_{F,RWA} = \begin{bmatrix} \ddots & & & & & & & & \\ & \frac{F+G}{2}+\omega & & & & & & & \\ & & \frac{F-G}{2}+\omega & & & & & & \\ & & & F-2E+\omega & \Omega' & & & & \\ & & & \Omega' & \frac{F+G}{2} & & & & \\ & & & & & \frac{F-G}{2} & & & \\ & & & & & & F-2E & \Omega' & \\ & & & & & & \Omega' & \frac{F+G}{2}-\omega & \\ & & & & & & & & \frac{F-G}{2}-\omega \\ & & & & & & & & & F-2E-\omega \\ & & & & & & & & & & \ddots \end{bmatrix}$$

The sub-matrix corresponding to the upper Autler-Townes branch is isolated:

$$H_{F,RWA}^U = \begin{bmatrix} \ddots & & & & & & & & \\ & \frac{F+G}{2}+\omega & & & & & & & \\ & & \frac{F-G}{2}+\omega & & & & & & \\ & & & F-2E+\omega & \Omega' & 0 & & & \\ & & & \Omega' & \frac{F+G}{2} & 0 & & & \\ & & & 0 & 0 & \frac{F-G}{2} & & & \\ & & & & & & F-2E & \Omega' & \\ & & & & & & \Omega' & \frac{F+G}{2}-\omega & \\ & & & & & & & & \frac{F-G}{2}-\omega \\ & & & & & & & & & F-2E-\omega \\ & & & & & & & & & & \ddots \end{bmatrix}$$

$$= \begin{bmatrix} F-2E+\frac{\omega}{2} & \Omega' & 0 \\ \Omega' & \frac{F+G}{2}-\frac{\omega}{2} & 0 \\ 0 & 0 & \frac{F-G}{2}-\frac{\omega}{2} \end{bmatrix} + \frac{\omega}{2}I.$$

Using the resonance condition $\omega=2E$ $$H^U_{F,RWA} = \begin{bmatrix} F-E & \Omega' & 0 \\ \Omega' & \frac{F+G}{2}-E & 0 \\ 0 & 0 & \frac{F-G}{2}-E \end{bmatrix} + EI,$$

the eigenvalues of this system are $$\omega_1 = \frac{F-G}{2},$$

$$\omega_2 = \left(\frac{3F+G}{4}\right) - \sqrt{\frac{(F-G)^2}{16} + \Omega'^2},$$

$$\omega_3 = \left(\frac{3F+G}{4}\right) + \sqrt{\frac{(F-G)^2}{16} + \Omega'^2}.$$

The energy difference in the decoherence-protected subspace is then determined:

$$|\omega_3 - \omega_2| = 2\sqrt{\frac{(F-G)^2}{16} + \Omega'^2}$$
$$= 2\sqrt{\frac{(F-G)^2}{16} + \frac{B_x^2 \Omega^2}{4B_x^2 - (F-G)^2}}.$$

A Maclaurin series expansion with respect to $B_x/F$ yields $$|\omega_2 - \omega_3| \approx \Omega - \frac{\Omega}{2}\left(\frac{B_x}{F}\right)^2 + \frac{1}{2}\left(\frac{F^2}{\Omega} + \frac{11\Omega}{4}\right)\left(\frac{B_x}{F}\right)^4 + O\left[\left(\frac{B_x}{F}\right)^6\right],$$

where similar quadratic and quartic dependences on $B_x$ as for the expansion in $B_z$, but now with a scale factor of F is seen. In our system, F is more than one order of magnitude larger than E, which accounts for the considerable decrease in sensitivity along the x-axis. It is thus conclude Either a large axial or transverse zero-field splitting is necessary for reduction of the effects from transverse magnetic field fluctuations. From this expression, $B_x$ is always suppressed by the effects of the sum of both zero-field splittings.

The dressing drive Rabi frequency, $\Omega$, once again must be chosen so that the energy level separation is sufficiently large, while minimizing multiplicative contributions to the quadratic and quartic terms in the expansion.

A range of magnetic fields where the inhomogeneity suppression is most effective can be derived through a similar method as detailed in the conclusion of the subsection entitled "Energy dispersion from $B_z$ noise contribution."

Estimation of Magnetic Field Fluctuation Magnitude from Nuclear Spin Bath

Using a Ramsey free evolution sequence, the undriven $T_2^*$ at $B_z=1.2$ mT for the kh divacancy used in this study is measured to be 1.35(2) μs. Additionally, no beat patterns in the Ramsey free evolution is observed, allowing for concluding that the free evolution decay is primarily caused by interactions with a weakly coupled nuclear spin bath. From this assumption, the upper bound of the magnetic field fluctuations of the bath by relating $T_2^*$ to the magnitude of energy inhomogeneity of the spin sublevels caused by the Zeeman effect can be estimated. From the uncertainty principle, $T_2^*$ can first be converted to an energy fluctuation $\Delta f = \Delta\omega/(2\pi)$ using the following relation $$\Delta f \approx \frac{1}{2T_2^*}.$$

The fluctuation intensity of the magnetic field, $\sigma_B$ may then be obtained, by scaling the energy fluctuations magnitude by the electron gyromagnetic ratio $\gamma$:

$$\sigma_B = \frac{\Delta f}{2\gamma} = \frac{1}{4\gamma T_2^*}.$$

Using our measured value of $T_2^*$ at $B_z=1.2$ mT, the z-axis magnetic field fluctuations is estimated to be $2\sigma_B \approx 13$ μT. At B=0, where the nuclear spins in the bath are no longer preferentially aligned to a field axis, assuming the magnitude of fluctuations remains the same but becomes an isotropic effect. Thus, for the following sections, 13 μT is considered as the magnetic fluctuation intensity along the z-axis, as well as in the plane orthogonal to the z-axis.

Simplified Model of Spin Energy Inhomogeneity from Nuclear Spin Bath Fluctuations The nuclear spin bath is approximated as a slowly fluctuating classical magnetic field, with an estimated amplitude derived from the procedure in the immediately preceding subsection section above. The fluctuation speed is considered to be much slower than any measurement timescale, so the magnetic field is quasi-static during the free evolution of the spin. Effectively, the spin then samples the distribution of magnetic fields from the bath, and inhomogeneous dephasing is the result of integrating all the contributions from the distribution. While this approximation may not hold when the measurement timescale approaches the characteristic timescale of spin bath fluctuations, this simplification allows us to derive a straightforward and predictive model for the protection effects of the decoherence-protected subspace on the spin.

Formally, the inhomogeneity of the spin levels is modeled by first considering the energy dispersion function of the spin qubit levels with respect to a particular axis i of magnetic field noise $$L(B_i) = \omega_1(B_i) - \omega_2(B_i),$$

where $\omega_n(B_i)$ is the nth spin energy level's value as a function of magnetic field $B_i$ along axis i. Any inhomogeneity in $B_i$ will also correspond to inhomogeneity in L, leading to a finite dephasing time. To further quantify this, a response function R relating inhomogeneity in $B_i$ to L is obtained. R then provides the instantaneous inhomogeneity of the spin as it is being perturbed by the bath. R is obtained by differentiating L with respect to $B_i$ $$R(B_i) = \frac{\partial L(B_i)}{\partial B_i}$$
$$= \frac{\partial \omega_1(B_i)}{\partial B_i} - \frac{\partial \omega_2(B_i)}{\partial B_i}.$$

For an electron spin primarily under the influence of the Zeeman effect, a linear response function $R(B_i)=1$ is obtained. For more complex dispersion functions, R is generally dependent on B. The Gaussian weighting of R is then obtained by considering the magnetic field fluctuations as a zero-mean Gaussian distribution $$N(B_i|0, \sigma_B) = \frac{1}{\sigma_B\sqrt{2\pi}} \exp\left[-\frac{B_i^2}{2\sigma_B^2}\right].$$

The weighted response function, R', is then $$R'(B_i) = R(B_i)N(B_i|0,\sigma_B).$$

By taking the root mean square (RMS) statistic of this quantity, an approximation of the inhomogeneous broadening from the magnetic field perturbation is obtained as $$\delta\omega = \sqrt{\int_{-\infty}^{+\infty} R'(B_i')^2\, dB_i'}.$$

In order to apply this model to our system, the inhomogeneity to the electron spin experiencing purely a linear Zeeman effect is first normalized. This can be done by defining $R(B_i)=1$ and integrating $$\delta\omega_z = \sqrt{\int_{-\infty}^{+\infty} N(B_i')^2\, dB_i'}$$
$$= \frac{1}{\sqrt{2\sigma_B\sqrt{\pi}}}$$

For the first case, the expected improvements from operating at the undriven clock transition at B=0 is examined.

The energy dispersion L between $|0\rangle$ and $|+\rangle$ is $$L(B_z) = \sqrt{B_z^2 + E^2} + D.$$

The response function R is then $$R(B_z) = \frac{B_z}{\sqrt{B_z^2 + E^2}}.$$

The RMS statistic is then $$\delta\omega_{CT} = \sqrt{\int_{-\infty}^{+\infty} R'(B_i')^2\, dB_i'},$$
$$\approx \frac{\delta\omega_z}{138}$$

which predicts that the inhomogeneity at the clock transition is approximately two orders of magnitude lower than at high fields where the Zeeman effect contributes linearly to the energy dispersion. This agrees well with our observation of $T_2^*$ increasing by about two orders of magnitude when changing the operating field from $B_z=1.2$ mT to B=0. Note that any discrepancy arising between the predicted and observed ratios may be explained by residual electric field fluctuations that are expected to perturb the spin to first-order near zero magnetic field and are not captured by this model.

Next, the spin when prepared in the decoherence-protected subspace is addressed. From above, it is expected that magnetic fluctuations along the z-axis are a primary limiting contribution to spin dephasing in the decoherence-protected subspace. Thus, the response function from the analytical energy dispersion for $B_z$ obtained above may be addressed as $$R(B_z) = \frac{B_z\left(4 - \frac{4E}{\sqrt{B_z^2+E^2}} - \frac{E^2\Omega^2}{(B_z^2+E^2)^2}\right)}{2\sqrt{\left(E - \sqrt{B_z^2+E^2}\right)^2 + \frac{E^2\Omega^2}{4(B_z^2+E^2)}}}.$$

The RMS statistic evaluated for the same $\sigma_B$ is then $$\delta\omega_{DPS} = \sqrt{\int_{-\infty}^{+\infty} R'(B_i')^2\, dB_i'}$$
$$\approx \frac{\delta\omega_z}{14200}.$$

Our measured ratio of $T_2^*$ between the electron spin under primarily the Zeeman effect to the spin in the decoherence-protected subspace is about 16600. Thus, this model correctly predicts, to within unity, the expected inhomogeneity improvement and the corresponding increase in $T_2^*$.

While this model closely predicts our measured ratios of spin inhomogeneity, it should be strictly treated as a phenomenological approach and does not completely capture the dynamics of the nuclear spin bath. In particular, time-correlation of the bath and its inherently quantum nature play a significant role in the dephasing of single quantum states, especially when the spin evolution time approaches the spin-spin coupling timescale of the bath (order 10 to 100 ms). Here, it is opted to treat inhomogeneity in time as an inhomogeneity over an effective ensemble of identical quantum systems, each experiencing a distribution of static magnetic fields.

Furthermore, this model is only applicable for quasi-static noise relative to the spin evolution, which plays a major role in determining $T_2^*$. Spin coherence time under dynamical decoupling $\tau_2$, however, depends on the spin's response to time-dependent noise during free evolution. Since time dependence of the noise in this model has be neglected, predict the expected $T_2$ coherence times of the spin in the decoherence-protected subspace cannot be properly predicted. For that, a proper treatment would require cluster expansion approaches that consider dynamical interactions between the electron spin and the bath and within the bath itself.

Contributions from Electric and Temperature Fluctuations

Electric field and temperature fluctuations couple to the divacancy spin system by affecting the axial and transverse zero-field splitting magnitudes. In particular, electric field noise is typically generated whenever optical excitation occurs, as photoactive impurities in the sample undergo charge state fluctuations. Considering this, the model developed in the immediately preceding subsection above is suitable for analysis here, as it can be assumed that minimal electric field fluctuations occur during spin evolution. Thus, the electric field noise is estimated by utilizing a similar argument as one made in the subsection entitled "Estimation of Magnetic fluctuation magnitude" in order to obtain the magnetic field noise.

At B=0, the undriven kh divacancy is particularly robust to magnetic field noise but experiences first-order sensitivity to fluctuations in E from electric field noise. Thus, the measured $T_2$ at those conditions is used as an approximate metric of spin energy inhomogeneity caused by electric field fluctuations $$\Delta f \approx \frac{1}{2T_2^*}.$$

Using the measured value of $T_2^*=163$ µs, the spin energy inhomogeneity stemming from electric field perturbations is identified to be about 3 kHz. By considering the higher sensitivity of E to electric fields when compared to D, the entirety of this inhomogeneity is attributed to fluctuations in E.

The driven basis is used to examine the effects of electric noise on the decoherence-protected subspace. The energy dispersion with respect to drive detuning is first obtained. Based on above and without imposing the resonance condition $\omega=2E$ $$H^U_{F,RWA} = \begin{bmatrix} D-\Delta & \Omega/2 & 0 \\ \Omega/2 & D+\Delta & 0 \\ 0 & 0 & -\omega/2 \end{bmatrix} + \frac{\omega}{2}I,$$

where $$\Delta = E - \frac{\omega}{2}$$

is defined as the detuning of the dressing drive. The resulting energy levels are $$\omega_1 = -\frac{\omega}{2},$$
$$\omega_2 = D - \sqrt{\left(\frac{\Omega}{2}\right)^2 + \Delta^2},$$
$$\omega_3 = D + \sqrt{\left(\frac{\Omega}{2}\right)^2 + \Delta^2}.$$

The energy difference in the decoherence-protected subspace is again given by the magnitude of the difference of the upper two energy levels $$|\omega_3 - \omega_2| = 2\sqrt{\left(\frac{\Omega}{2}\right)^2 + \Delta^2}.$$

For the purposes of this analysis, the dressing drive is treated as fixed at $\Omega/(2\pi)=350$ kHz, with no fluctuations. The frequency noise of the dressing drive is treated as negligible. It can be seen that D does not affect the energy difference in this subspace. The fluctuations of E manifest directly in $\Delta$, $\delta\Delta=\delta E$. Thus, the response function R, now as a function of $\Delta$, is obtained as $$R(\Delta) = \frac{2\Delta}{\sqrt{\left(\frac{\Omega}{2}\right)^2 + \Delta^2}},$$

while the electric field fluctuations are still described as a Gaussian distribution, where $\sigma_\Delta \approx \Delta f/2 = 1.5$ kHz is used to describe the electric field fluctuation magnitude $$N(\Delta|0,\sigma_\Delta) = \frac{1}{\sigma_\Delta\sqrt{2\pi}}\exp\left[-\frac{\Delta^2}{2\sigma_\Delta^2}\right].$$

Evaluating the relative inhomogeneity yields $$\frac{\delta\omega_{ZF}}{\delta\omega_{DPS}} = \frac{\sqrt{\int_{-\infty}^{+\infty} N(\Delta')^2 d\Delta'}}{\sqrt{\int_{-\infty}^{+\infty} R(\Delta')^2 N(\Delta')^2 d\Delta'}}$$

$$= \frac{\sqrt{\int_{-\infty}^{+\infty} N(E'-E)^2 dE'}}{\sqrt{\int_{-\infty}^{+\infty} R(E'-E)^2 N(E'-E)^2 dE'}},$$

$$\approx 83$$

suggesting that the decoherence-protected subspace produces an improvement in protection from electric field noise by almost two orders of magnitude. Further reduction to electric field noise can be achieved by suppressing the source of electric field fluctuations through charge depletion techniques, which has previously been leveraged to observe near-transform-limited linewidths in the electrically sensitive optical spectrum of single divacancies.

Temperature fluctuations are heavily suppressed by the natural insensitivity of D and E in the cryogenic regime, even without the decoherence-protected subspace. However, the improvement in protection from fluctuations in D and E applies equally, regardless of the underlying source of fluctuations. This allows us to conclude that a two order of magnitude improvement in thermal protection is achieved, on top of the intrinsic suppression at cryogenic temperatures.

Numerical Master Equation Simulations

The exact dynamics of the dressed spin system is obtained by using a numerical master equation simulation. The system Hamiltonian defined above, while also adding in a probe field applied along $S_x$ is implemented as:

$$H = DS_z^2 + E(S_x^2 - S_y^2) + \gamma(B_xS_x + B_zS_z) + \Omega\cos(\omega t)S_z + \Omega_p\cos(\omega_p t)S_x,$$

where $\Omega_p$ is the probe Rabi frequency and $\omega_p$ is the probe drive frequency. In order to best approximate experimental conditions, the probe Rabi frequency is chosen as $\Omega_p/(2\pi)=20$ kHz, while the dressing drive Rabi frequency is chosen to be $\Omega/(2\pi)=350$ kHz. The system is initialized into $|0\rangle$ and evolved over 25 µs, so that when the probe pulse is on resonance the population in $|0\rangle$ is fully transferred to $|+1\rangle$ or $|-1\rangle$ at the end of the unitary evolution. Both the dressing and probe fields are enabled for the full duration of the simulation. The value of $B_x$ (FIG. 3c) or $B_z$ (FIG. 3d) is then swept while varying the detuning $\Delta=\omega-(D+E)$ of the probe field. The remaining population of $|0\rangle$ at the end of the simulation is then recorded.

Emergent Nature of Coherence Enhancement

Individually, clock transitions and periodic driving may be explored in various implementations, giving rise to improvements in coherence over operating at non-clock transitions and without driving. However, the combination of the two may provide a larger improvement than the individual procedures, because the limitations of each constituent component are mitigated by the action of the other component.

A clock transition, by itself, may allow the system to become insensitive to all axes of magnetic field fluctuations. However, since the energy splitting at the clock transition, 2E, has first-order sensitivity to electric field fluctuations, 2 $T_2^*$ rapidly becomes limited by electric field noise.

Meanwhile, periodic driving of a non-clock transition may result in a dressed system where the energy levels are dependent on both the Rabi frequency of the drive and applied magnetic field. In the limit of small Rabi frequencies, $\Omega \ll B_z$, this results in a system that has significant sensitivity to fluctuations in B. On the other hand, operating at $\Omega \gg B_z$ may reduce this sensitivity but may necessitate large $\Omega$ and result in proportionally larger fluctuations $d\Omega$.

When these two components are combined, a driven clock transition may allow for the system to become insensitive to electric field fluctuations to first order and magnetic field fluctuations to approximately third order. Additionally, the resulting energy splitting of the dressed system may be primarily determined only by the magnitude of $\Omega$, since the effect of $B_z$ is largely suppressed by a factor of E. Thus, there is greater freedom in selecting a value of $\Omega$ that still suppresses the effect of magnetic field noise without having to increase $\Omega$ and $d\Omega$.

Generalizability of the Decoherence-Protected Subspace

Having considered the primarily magnetic fluctuation contributions along all spatial axes coupling through $S_x$, $S_y$, $S_z$, as well as a large subset of fluctuations coupling through product operators (thermal and electric contributions to $s_x^2$ and $S_x^2-S_y^2$), implementing this decoherence-protected subspace is not reliant on any particular detail or property specific to the kh divacancy or the form of the environmental noise. Instead, its effectiveness is based on the large magnitudes of the matrix elements in the spin Hamiltonian corresponding to $s_z^2$ and $S_x^2-S_y^2$. Thus, an arbitrary system that is able to implement these elements in an equivalent fashion, while also capable of driving an equivalent $S_z$ continuous tone, should expect to see coherence protection through a similar mechanism as demonstrated here. The efficacy of the decoherence-protected subspace is strongly dependent on the magnitude of these Hamiltonian matrix elements. Significantly lower values of D and E (or their equivalent in another system) will generally correspond to greater spin inhomogeneity than what has been observed here, as the spin is protected from a smaller range of environmental fluctuation magnitudes. Conversely, this protocol in systems with higher values of E (or its equivalent) is expected to be more effective at suppressing decoherence, up to the $\tau_1$ energy relaxation limit.

A lower bound to E can be established at the point where the typical gate time in the decoherence protected subspace DPS is comparable to the $2T_2^*$ in the DPS. By using the phenomenological model for inhomogeneous dephasing time improvements in the DPS, it can be found that when $E/(2\pi)$ is reduced to about 1 MHz and $\Omega/(2\pi)$ is reduced to 100 kHz (to keep the rotating wave approximation valid), the resulting $2T_2^*$ in the DPS is estimated to be approximately 15 µs. However, the time to implement a spin rotation may be limited to order 10 µs by the energy splitting in the DPS, which is determined by the Rabi frequency of the dressing drive. Thus, in such a system, even though coherences in the DPS are more robust when compared to their undriven counterparts, the increase in gate time may limit the number of useful operations.

Other quantum systems that do not have an explicit spin-1 structure with non-negligible values of D and E may still stand to benefit from this protocol. Most generally, this protocol uses a clock transition that can sustain a continuous drive between its levels. Thus, other interactions such as isotropic hyperfine interactions and anharmonicity in non-linear quantum circuits may be used, with some modifications to the system parameters.

For example, bismuth and phosphorus donor spin systems in silicon with strong isotropic hyperfine interactions result in clock transitions at particular magnetic field configurations. Coherent control of these transitions may lead to the possibility of implementing a continuous drive on this transition. The energy dispersion with respect to z-axis magnetic fields of the Si:P system at zero field of the clock transition levels (between S and T0, for example) may be, $$|\omega_s - \omega_{T_0}| = \sqrt{|A|^2 + (\gamma B_z)^2}.$$

where A, the magnitude of the hyperfine interaction, is approximately 117.53 MHz. This form of the energy dispersion is almost identical to the form between the $|+\rangle$ and $|-\rangle$ levels of the kh divacancy at zero field, $$|\omega_+ - \omega_-| = 2\sqrt{E^2 + (\gamma B_z)^2},$$

This shows that the hyperfine interaction A in the donor spin system may serve a purpose analogous to the transverse zero-field splitting E in the kh divacancy system. The analysis presented above thus may translate to these spin systems by making the substitution E→A.

For anharmonic quantum oscillators, superconducting transmon qubits operated at a sweet spot may be used. Here, the large ratio of the junction energy to the charging energy, $E_J/E_C$, forms a clock transition with respect to charge fluctuations. However, $E_J$ can still fluctuate strongly due to flux noise (for a tunable transmon qubit). A comparison to the kh divacancy system may be made, where the effect of E is to form a clock transition with respect to magnetic field fluctuations but allows first-order fluctuations from electric field noise. Since the DPS suppresses this electric field noise to second order and magnetic field noise to higher order, similar effects are expected for flux noise and charge noise, respectively, in a driven transmon qubit at a sweet spot.

Furthermore, for host crystals producing large magnitudes of magnetic noise, it may become impractical to find a spin system with a sufficiently strong transverse zero-field splitting to produce a clock transition energy splitting large enough to allow for this protocol to be fully effective. In these host crystals, substitutional ions may be used as candidate spin systems as they can leverage large hyperfine interactions between the bound electrons and the substitutional nuclear spin to produce the necessary clock transition energy splittings to implement this protocol.

Spin Resonance Feedback

From the quasienergy spectrum of the $|\pm1\rangle$ basis, $\Omega$ and the dressing drive Rabi frequency provide the quantization energy of the basis states to first order. Thus, fluctuations in the dressing drive Rabi frequency is expected to affect the resonance frequency of the $|+1\rangle \leftrightarrow |-1\rangle$ transition, which also directly affects the spin energy inhomogeneity in this basis. Experimentally, these fluctuations are generated by thermal fluctuations of the AWG oscillator and amplifier stages, which for the AWG model is specified to be approximately 100 ppm/° C. The laboratory long-term temperature stability is within 0.5° C., leading to approximately 50 ppm fluctuations of $\Omega$. At $\Omega/(2\pi)$=350 kHz, this corresponds to fluctuations in the Rabi frequency of $\delta\Omega/(2\pi)$=17.5 Hz. The spin energy inhomogeneity under magnetic and electric field fluctuations to be within this same range, which indicates that the dressing drive amplitude inhomogeneity may also play a role in limiting the observed spin inhomogeneity, if left unchecked.

By observing the fluctuations of the feedback error signal detailed above, it is concluded that the dressing drive amplitude drifts on the timescale of many minutes. This allows us to effectively implement a feedback protocol given the quasi-static nature of the drift relative to the coherence time of the spin. A feedback period of one minute is chosen above as a compromise between frequently evaluating the error signal and maximizing the duty cycle of experimental acquisition. Depending on the application, the error signal may need to be evaluated more or less frequently than this period in order to properly mitigate the effect of quasi-static drifts. Improvements to photon collection efficiency will also reduce the integration time necessary to reliably evaluate the error signal.

Note that this feedback mechanism, while primarily purposed to counteract drifts from the dressing drive amplitude, also reduces the effect of slow inhomogeneous drifts from local variations in electric and magnetic field. Noise on timescales much shorter than the error signal evaluation time (10 s in this work) but longer than the spin coherence time will average to zero and cannot be corrected for. However, slower fluctuations, possibly from optically induced charge migration and drift in the applied magnetic field, can manifest as a change in the error signal. Since the action of the feedback scheme involves applying corrections to the spin rotation drive detuning, the implementation is also robust to other detectable sources of inhomogeneity.

Finally, active feedback on the microwave drive amplitude itself can be implemented in the form of automatic leveling control (ALC) modules directly at the output of the microwave oscillator. A selection of ALC modules take a dc voltage input as the leveling amplitude setpoint. Thus, the use of an ALC module can suppress the drifts of the drive amplitude from, e.g., the 50 ppm fluctuations observed down to the long-term stabilities of dc voltage sources, which can be as low as, for example, 1 ppm.

Throughout the specification and claims, terms may have nuanced meanings suggested or implied in context beyond an explicitly stated meaning. Likewise, the phrase "in one embodiment/implementation" or "in some embodiments/implementations" as used herein does not necessarily refer to the same embodiment and the phrase "in another embodiment/implementation" or "in other embodiments/implementations" as used herein does not necessarily refer to a different embodiment/implementation. It is intended, for example, that claimed subject matter may include combinations of example embodiments/implementations in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The invention claimed is:

1. A method comprising:
providing a quantum system having a first quantum state, a second quantum state, and a third quantum state corresponding to a first energy level, a second energy level, and a third energy level forming a first quantum subspace;
applying a dressing drive field, resonant with an energy splitting between the second and third energy levels, to induce a hybridization of the dressing drive field and the second and third energy levels to generate a fourth hybridized state and a fifth hybridized state wherein the first quantum state, the fourth hybridized state and the fifth hybridized state form a second quantum subspace with enhanced coherence protection of a quantum state of the quantum system from environmental noises over the first quantum subspace;
performing a coherent control of a quantum superposition in the second quantum subspace while maintaining the dressing drive field;
mapping the quantum superposition in the second quantum subspace to the first quantum subspace; and
reading out the quantum superposition in the first quantum subspace.

2. The method according to claim 1, wherein mapping the quantum superposition in the second quantum subspace to the first quantum subspace comprises a non-adiabatic removal of the dressing drive field.

3. The method according to claim 2, wherein the non-adiabatic removal of the dressing drive field comprises removing the dressing drive field at a time scale faster than an inverse of the energy splitting between the second and the third energy levels.

4. The method according to claim 1, wherein the fourth and the fifth hybridized states are formed via an Autler-Townes splitting induced by the dressing drive field resonant with the energy splitting between the second and the third quantum states.

5. The method according to claim 4, wherein the fourth and the fifth hybridized states are formed by mixing the second and third quantum states.

6. The method according to claim 1, further comprising providing a feedback error signal to adjust an amplitude of the dressing drive field to compensate for driving amplitude or frequency drift.

7. The method according to claim 1, further comprising initializing the quantum system to the first quantum initialization in the first quantum subspace wherein performing a coherent control of the quantum superposition in the second quantum subspace comprises at least one of:
resonantly driving a transition between the first quantum state and the fourth hybridized state;
resonantly driving a transition between the first quantum state and the fifth hybridized state;
resonantly driving a transition between the fourth hybridized state and the fifth hybridized state; or
resonantly driving a transition between the fourth hybridized state or the fifth hybridized state and a clone hybridized state of the fourth hybridized state or the fifth hybridized state.

8. The method according to claim 1, where in the dressing drive field comprises a continuous-wave electromagnetic filed resonant with the second and third energy levels.

9. The method according to claim 1, wherein the quantum system comprises an electronic spin system and the first, the second, and the third quantum states comprises a first, second, and third spin states.

10. The method according to claim 9, wherein reading out the quantum superposition in the first quantum subspace comprising optically mapping the quantum superposition to an optically bright state of the electronic spin system and measuring an optical emission from the optically bright state.

11. The method according to claim 10, wherein the optical emission from the optically bright state is measured via a phonon side band emission of the optically bright state.

12. The method according to claim 9, wherein a protection of the quantum superposition from environmental electric or magnetic field fluctuations in the second quantum subspace is enhanced by at least one order of magnitude compared with the first quantum subspace.

13. The method according to claim 9, wherein the energy splitting between the second and third energy levels at a zero external magnetic field is larger than an energy splitting threshold so that the second and third energy levels do not cross under external magnetic field smaller than a magnetic field threshold and wherein the first, second, and third spin states comprise electronic orbital ground states.

14. The method according to claim 9, wherein performing the coherent control of the quantum superposition in the second quantum subspace comprises driving a transition between the first spin state and the fourth hybridized state or a transition between the first spin state and the fifth hybridized by a resonant magnetic field or driving a transition between the fourth hybridized state and the fifth hybridized state by a resonant electric field.

15. The method according to claim 9, wherein the electronic spin system comprises a solid-state host with a defect.

16. The method according to claim 15, wherein the solid-state host comprises a semiconductor lattice and wherein the semiconductor lattice is a silicon carbide crystalline lattice and the defect comprises a divacancy defect.

17. The method according to claim 16, wherein the divacancy defect is a basally oriented divacancy in the silicon carbide crystalline lattice.

18. The method according to claim 16 wherein the divacancy defect is a kh divacancy in the silicon carbide crystalline lattice and wherein the silicon carbide crystalline lattice is configured in a 4H polytype.

19. A device comprising:
a quantum system; and
at least two electrodes adapted to apply external electric or magnetic fields to the quantum system,
wherein:
the quantum system comprises a first quantum state, a second quantum state, and a third quantum state corresponding to a first energy level, a second energy level, and a third energy level forming a first quantum subspace;
the at least two electrodes are adapted to apply a dress drive field resonant with an energy splitting between the second and third energy levels to induce a hybridization of the dressing drive field and the second and third energy levels to generate a fourth hybridized state and a fifth hybridized state wherein the first quantum state, the fourth hybridized state and the fifth hybridized state form a second quantum subspace with enhanced coherence protection of a quantum state of the quantum system from environmental noises over the first quantum subspace; and
the at least two electrodes are adapted to effectuate a coherent control of a quantum superposition in the second quantum subspace while maintaining the dressing drive field.

20. The device according to claim 19, wherein:
the quantum system comprises an electronic spin system and the first, the second, and the third quantum states comprises a first, second, and third spin states;
the first, second, and third spin states comprise electronic orbital ground states;
the quantum system comprises a solid-state host embedded with a defect; and
solid-state host comprises a silicon carbide crystalline lattice and the defect comprises a divacancy defect.

* * * * *